United States Patent
Tanaka

(10) Patent No.: US 9,458,781 B2
(45) Date of Patent: Oct. 4, 2016

(54) CONTROL DEVICE OF INTERNAL COMBUSTION ENGINE AND METHOD OF CONTROLLING THE SAME

(71) Applicant: Toyota Jidosha Kabushiki Kaisha, Toyota-shi Aichi-ken (JP)

(72) Inventor: Hiroshi Tanaka, Susono (JP)

(73) Assignee: Toyota Jidosha Kabushiki Kaisha, Toyota-shi Aichi-ken (JP)

( * ) Notice: Subject to any disclaimer, the term of this patent is extended or adjusted under 35 U.S.C. 154(b) by 0 days.

(21) Appl. No.: 14/269,759

(22) Filed: May 5, 2014

(65) Prior Publication Data

US 2014/0331649 A1    Nov. 13, 2014

(30) Foreign Application Priority Data

May 7, 2013    (JP) .................................. 2013-097627

(51) Int. Cl.
F02D 41/02    (2006.01)
F02D 41/12    (2006.01)
F01N 3/10    (2006.01)

(52) U.S. Cl.
CPC ......... F02D 41/0235 (2013.01); F02D 41/123 (2013.01); *F01N 3/101* (2013.01); *F02D 2200/0802* (2013.01); *Y02T 10/22* (2013.01)

(58) Field of Classification Search
CPC ............. F02D 41/029; F02D 41/0275; F02D 41/1441; F02D 41/0295; F02N 3/0842; F02N 3/035; F02N 13/035
USPC .................. 60/273, 274, 285, 286, 295, 301
See application file for complete search history.

(56) References Cited

U.S. PATENT DOCUMENTS

| | | | | |
|---|---|---|---|---|
| 6,526,745 B1 * | 3/2003 | Ogiso | .................... | F01L 9/04 123/321 |
| 2005/0119822 A1 * | 6/2005 | Surnilla | ................ | F01N 11/002 701/114 |
| 2006/0117739 A1 * | 6/2006 | Ichimoto | ................ | B60K 6/445 60/285 |
| 2009/0093526 A1 * | 4/2009 | Miller | .................... | A61K 31/17 514/357 |
| 2010/0093526 A1 | 4/2010 | Tanaka et al. | | |
| 2014/0202138 A1 * | 7/2014 | Tanaka | .................. | F02D 41/123 60/286 |
| 2014/0331652 A1 * | 11/2014 | Tanaka | .................. | F01N 11/007 60/285 |

FOREIGN PATENT DOCUMENTS

| | | | | |
|---|---|---|---|---|
| JP | 08144814 | A | * | 6/1996 |
| JP | 10248114 | A | * | 9/1998 |
| JP | 10252532 | A | * | 9/1998 |
| JP | 10280990 | A | * | 10/1998 |
| JP | 11107825 | A | * | 4/1999 |
| JP | 2001059444 | A | * | 3/2001 |

(Continued)

OTHER PUBLICATIONS

JP 2006183624, Machine Translation, Translated on Mar. 13, 2016.*

*Primary Examiner* — Patrick Maines
(74) *Attorney, Agent, or Firm* — Dinsmore & Shohl LLP

(57) ABSTRACT

In an internal combustion engine that is capable of performing a fuel supply cut control (FC control), a performance of the FC control is suspended, in a case where, when the performance of the FC control is requested to initiate, a deviation between a solid solution of an active element in a carrier and a target solid solution is equal to or more than a predetermined upper limit value and a catalyst temperature is equal to or more than a predetermined upper limit temperature.

13 Claims, 8 Drawing Sheets

(56) References Cited

FOREIGN PATENT DOCUMENTS

| JP | 2005066559 A | * | 3/2005 | ............. B01J 23/78 |
| JP | 2006-183624 A | | 7/2006 | |
| JP | 2006183624 A | * | 7/2006 | |
| JP | 2008012480 A | * | 1/2008 | |
| JP | 2011069338 A | * | 4/2011 | |
| WO | 2008096575 A1 | | 8/2008 | |
| WO | 2013030949 A1 | | 3/2013 | |
| WO | 2013084307 A1 | | 6/2013 | |

* cited by examiner

F I G . 11
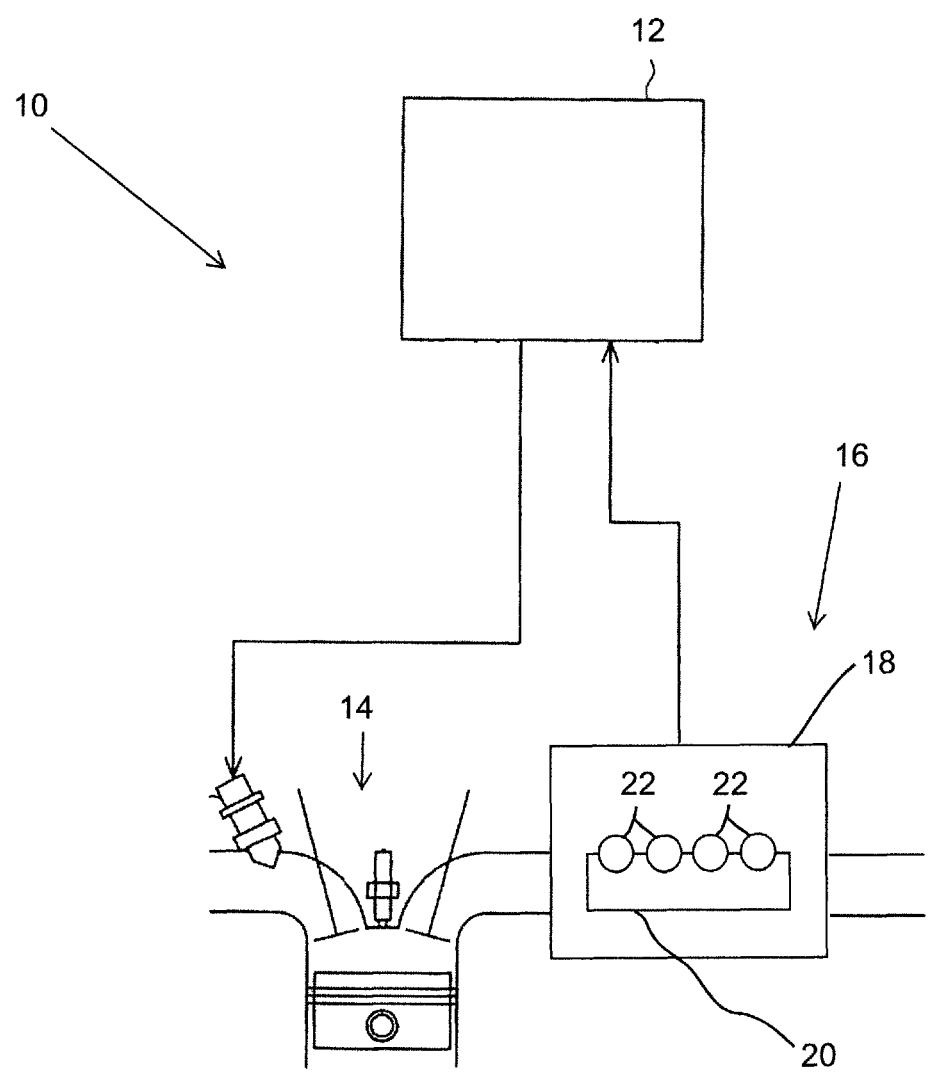

CONTROL DEVICE OF INTERNAL COMBUSTION ENGINE AND METHOD OF CONTROLLING THE SAME

INCORPORATION BY REFERENCE

The disclosure of Japanese Patent Application No. 2013-097627 filed on May 7, 2013 including the specification, drawings and abstract is incorporated herein by reference in its entirety.

BACKGROUND OF THE INVENTION

1. Field of the Invention

The present invention is directed to a control device of an internal combustion engine and a method of controlling the same. In particular, the present invention is directed to a control device of an internal combustion engine and a method of controlling the same which make it possible to restrict an unexpected change in the purification ability of the catalyst while suppressing the fuel economy deterioration and emission deterioration which are associated with an intervention in the air-fuel ratio control, the internal combustion engine being provided with an exhaust gas purification device wherein a catalyst is used whose active element forms a solid solution component in a carrier if a temperature of the catalyst is equal to or more than a predetermined first solid solution temperature and an internal atmosphere of the catalyst is an oxidizing atmosphere and whose active element is precipitated from the carrier if the temperature of the catalyst is equal to or more than a predetermined deposition temperature and the internal atmosphere of the catalyst is a reducing atmosphere.

2. Description of Related Art

In the technical field concerned, an exhaust gas purification device is known that has an exhaust gas purification catalyst for purifying a specific component contained in an exhaust gas emitted from an combustion chamber of an internal combustion engine. In general, such an exhaust gas purification catalyst includes an element serving for activating an oxidizing reaction or a reducing reaction of a specific component contained in the exhaust gas (hereinafter, such an element is sometimes referred to as "active element") and a carrier serving for carrying the active element. Regarding such a catalyst, as well known, during use, the catalyst's ability of purifying the specific component in the exhaust gas (which is sometimes referred to as "purification ability" in this specification) is deteriorated which results from the reduction of the outer surface in accordance with the grain growth due to the aggregation of the active element (for example, noble metal element having catalytic activity).

Thus, in the technical field concerned, as the catalyst having the above described structure, a substance is widely used, which has a carrier formed of a composite oxide, has characteristics wherein the active element forms a solid solution component in the carrier if an internal atmosphere of the catalyst is an oxidizing atmosphere, while the active element is deposited from the carrier if the internal atmosphere of the catalyst is a reducing atmosphere. Such a catalyst, depending on the internal combustion engine operation condition, repeats the solid solution of the active element in the carrier (composite oxide) in the oxidizing atmosphere and the deposit of the active element from the carrier in the reducing atmosphere, thereby restricting the aforementioned grain growth (see, for example, International Publication No. 2008/096575 (WO 2008096575)).

However, during operation of the internal combustion engine, depending on the internal combustion engine operation condition, the temperature of the catalyst (sometimes referred to as "catalyst temperature" in this specification) and an air-fuel ratio of the exhaust gas entering the catalyst (sometimes referred to as "exhaust gas-fuel ratio" in this specification) vary. More specifically, the catalyst temperature sometimes reaches a temperature at which the active element can form a solid solution component in the carrier (which is sometimes referred to as "specific solid solution temperature" in this specification) or reach a temperature at which the active element can deposit from the carrier (which is sometimes referred to as "specific deposition temperature" in this specification). In addition, the exhaust gas-fuel ratio become leaner or richer than a theoretical air-fuel ratio. As a result, the internal atmosphere of the catalyst is sometimes the oxidizing atmosphere and otherwise the reducing atmosphere.

Thus, when the catalyst temperature is equal to or more than the specific solid solution temperature and the internal atmosphere of the catalyst is the oxidizing atmosphere, forming of the solid solution of the active element in the carrier proceeds, while when the catalyst temperature is equal to or more than the specific deposit temperature and when the internal atmosphere of the catalyst is the reducing atmosphere, the deposition of the active element from the carrier proceeds. Sometimes the internal combustion engine operation condition may unbalance the solid solution and deposition of the catalyst as described above, which reduces an amount of the active element which is capable of developing a catalytic function (i.e., the active element which is deposited from the carrier), resulting in that the purification ability of the catalyst may change. In addition, as described above, as is known, during use, the catalyst's ability of purifying the specific component in the exhaust gas (which is sometimes reoffered to as "purification ability") is deteriorated which results from the shrinkage of the outer surface in accordance with the grain growth due to the aggregation of the active element.

In view of the above, with respect to the exhaust gas purification catalyst that is related to the present invention, attempts have been made in which by, for example, inhibiting a fuel cut control (hereinafter, such a control is referred to as "FC control") in a case where the catalyst temperature is equal to or more than the specific temperature, the solid solution of the active element in the oxidizing atmosphere is prevented from being proceeded in order to restrict the degradation of the catalyst purification ability caused by the grain growth of the active element and an amount fuel is increased to lower the temperature of the catalyst for the prevention of possible thermal deterioration thereof. In brief, the design concept of the aforementioned exhaust gas purification catalyst focuses on the restriction of the deterioration of the catalyst which is to be achieved by setting the initial purification ability of the catalyst at a high level based on forecasting the deterioration of the catalyst.

The aforementioned related art will be detailed with reference to the attached drawings. FIG. 1 is a graph that schematically indicates the purification ability transition diagram throughout the useful life (effective life or service life) of an exhaust gas purification catalyst according to a related art of the present invention. In the graph shown in FIG. 1, an abscissa represents a use period of a catalyst (for example, if an internal combustion engine is mounted on an automotive vehicle, the mileage of the vehicle is available as this period), while an ordinate represents a content percentage of a specific component in an exhaust gas (hereinafter, sometimes referred to as "emission"). Thus, in FIG. 1, the curve depicted by a thin solid line represents a transition of the purification ability throughout the use period of the exhaust gas purification catalyst according to the related art.

In the exhaust gas purification catalyst according to the related art that is illustrated in FIG. 1, as described above, the design of this catalyst sets the initial purification ability to be at a high level by forecasting the possible catalyst degradation in order that even when the emission is degrades (even the content percentage of the specific component in the exhaust gas increase) caused by the catalyst deterioration during use, the emission is restricted to exceed a predetermined upper limit (plotted by a thin dotted line in FIG. 1). Thus, in cases where, for example, the purification ability of the exhaust gas purification catalyst is requested to increase by, for example, enhancement of emission regulations (indicated by a black arrow in FIG. 1) and where the useful life is requested to get longer (indicated by a void arrow in FIG. 1), the purification ability of the catalyst has to be designed so as to be able to achieve a lower emission level even in a final stage as the curve line plotted by the thick solid line shown in FIG. 1.

In addition, for confirming whether the catalyst that is designed by the aforementioned concept can maintain the desired purification ability throughout the useful life (effective life or service life), it was inevitable to repeat processes each of which requires significant man-hour and which includes performing different durability tests (including acceleration tests), assessing the content percentage of the specific component in the exhaust gas (emission) emitted from the combustion chamber of the internal combustion engine in which is used the catalyst after the durability tests and other items, and reviewing the design specifications of the catalyst.

Furthermore, while the aforementioned internal combustion engine is in operation, in order to allow the internal combustion engine to exhibit its performances in the event of a change of the purification ability of the catalyst, it is required to construct a control logic for use in a control related to the internal combustion engine which takes into account of such a change of the purification ability of the catalyst (hereinafter, such a control sometimes may be referred to as "engine control"), and executing such an engine control on the basis of thus constructed control logic. However, as described above, due to the fact that the change of the purification ability of the catalyst while the internal combustion engine is in operation is affected by, for example, the internal combustion engine operation conditions and the use degree of the catalyst, it is extremely cumbersome to construct the control logic that takes into account of the aforementioned change of the purification ability of the catalyst and to execute the engine control.

In view of the above, in the technical field concerned, various attempts have been proposed, wherein the aforementioned change of the purification ability of the catalyst is controlled by a positive intervention in the air-fuel ratio control being performed while the internal combustion engine is in operation, for example. For example, a technique has been proposed for preventing the catalyst activity deterioration in which a time during which the catalyst is being exposed to the exhaust gas of lean air-fuel ratio at equal to or a higher temperature than a predetermined temperature is integrated as a high lean time, and the engine air-fuel ratio is switched to rich when the high temperature lean time comes to be a predetermined time or more, thereby depositing a catalyst metal, which forms a solid solution component in a support material formed of an oxide, therefrom (see, for example, Japanese Patent Application Publication No. 2006-183624 (JP 2006-183624 A)).

In addition, the present applicant has proposed a technique in which the exhaust gas-fuel ratio is made to be leaner than a theoretical air-fuel ratio in a case where the solid solution of the active element is equal to or less than the target value or the lower limit value of the target range and the catalyst solid solution temperature is equal to or more than the specific solid solution temperature, while the exhaust gas-fuel ratio is made to be richer than the theoretical air-fuel ratio in a case where the solid solution of the active element is equal to or more than the target value or the upper limit value of the target range and the catalyst temperature is equal to or more than the specific deposit temperature. Moreover, the present applicant has also proposed a technique in which in a case where the fuel supply stop control is inhibited when the catalyst temperature is equal to or more than a first threshold vale, so long as the use degree of the catalyst is being equal to or less than a predetermined degree, the first threshold value is reduced from its criteria to a lower value, while in a case where the fuel supply stop control is permitted when the catalyst temperature is equal to or more than a second threshold value, so long as the use degree of the catalyst is being equal to or less than the predetermined degree, the second threshold value is increased from its criteria to a higher value.

In any of the techniques as described above, the positive intervention in the air-fuel ratio control that is being performed while the internal combustion engine is in operation makes it possible to control the aforementioned change of the purification ability of the catalyst, whereby for example a relatively easy construction of a control logic for use in the engine control and a relatively easy performance of the engine control can be established.

However, recently, many internal combustion engines, from the viewpoints of, for example, energy efficiency and protecting global environment, perform an advanced air-fuel ratio control in order to establish both high operational performance and improvement in fuel and emission. Thus, making the aforementioned positive intervention in the air-fuel ratio control to control the change of the purification ability of the catalyst may sometimes reduce the improved effects of the fuel efficiency and emission which are achieved by the air-fuel ratio control, which may results in a fear of deteriorating the fuel efficiency and emission.

Thus, in the technical field concerned, regarding an internal combustion engine provided with an exhaust gas purification device that uses a catalyst whose active element forms a solid solution component in a carrier if a temperature of the catalyst is equal to or more than a predetermined first solid solution temperature and if an internal atmosphere of the catalyst is an oxidizing atmosphere and whose active element is deposited from the carrier if the temperature of the catalyst is equal to or more than a predetermined deposition temperature and if the internal atmosphere of the catalyst is a reducing atmosphere, there is a need for solution that is capable of restricting an unexpected change in the purification ability of the catalyst while suppressing the fuel economy deterioration and emission deterioration which follow an intervention to the air-fuel ratio control.

SUMMARY OF THE INVENTION

As described above, regarding an internal combustion engine provided with an exhaust gas purification device that uses a catalyst whose active element forms a solid solution component in a carrier if a temperature of the catalyst is equal to or more than a predetermined first solid solution temperature and an internal atmosphere of the catalyst is an oxidizing atmosphere and whose active element is deposited from the carrier if the temperature of the catalyst is equal to or more than a predetermined deposition temperature and the internal atmosphere of the catalyst is a reducing atmosphere, there is a need for solution that is capable of restricting an unexpected change in the purification ability of the catalyst while suppressing the fuel economy deterioration and emission deterioration which follow an intervention to the air-fuel ratio control. That is to say, an object of the present invention is to provide a control device of an internal combustion engine, which is capable of restricting an unexpected change in the purification ability of the catalyst while suppressing the fuel economy deterioration and emission deterioration which follow an intervention to the air-fuel ratio control, the internal combustion engine being provided with an exhaust gas purification device that uses a catalyst whose active element forms a solid solution in a carrier if a temperature of the catalyst is equal to or more than a predetermined first solid solution temperature and if an internal atmosphere of the catalyst is an oxidizing atmosphere and whose active element is precipitated from the carrier if the temperature of the catalyst is equal to or more than a predetermined deposition temperature and if the internal atmosphere of the catalyst is a reducing atmosphere.

A control device of an internal combustion according to a first aspect of the present invention includes a control unit configured to perform a fuel supply stop control for stopping a fuel supply to a combustion chamber and an exhaust gas purification device that purifies an exhaust gas emitted from the combustion chamber. The exhaust gas purification device includes a catalyst that has an active element and a carrier, the active element being served for activating an oxidizing reaction or a reducing reaction of a specific component contained in the exhaust gas, the carrier being served for carrying the active element. The active element forms a solid solution component in the carrier if a temperature of the catalyst is equal to or more than a predetermined first solid solution temperature and an internal atmosphere of the catalyst is an oxidizing atmosphere, while the active element is precipitated from the carrier if the temperature of the catalyst is equal to or more than a predetermined deposition temperature and if the internal atmosphere of the catalyst is a reducing atmosphere. The control unit is configured to calculate a deviation between a solid solution that represents a degree the active element forms the solid solution component in the carrier and a target solid solution, and suspends the fuel supply stop control to perform if the deviation is equal to or more than a predetermined first threshold value and the temperature of the catalyst is equal to or more than a predetermined second solid solution temperature.

Regarding a method of controlling an internal combustion engine according to a second aspect of the present invention, the internal combustion engine being provided with an exhaust gas purification device that purifies an exhaust gas emitted from the combustion chamber, the gas purification device including a catalyst that has an active element and a carrier, the active element being served for activating an oxidizing reaction or a reducing reaction of a specific component contained in the exhaust gas, the carrier being served for carrying the active element. The active element forms a solid solution component in the carrier if a temperature of the catalyst is equal to or more than a predetermined first solid solution temperature and an internal atmosphere of the catalyst is an oxidizing atmosphere, while the active element is deposited from the carrier if the temperature of the catalyst is equal to or more than a predetermined deposition temperature and if the internal atmosphere of the catalyst is a reducing atmosphere. The method includes the steps of: calculating a deviation between the solid solution that represents a degree the active element forms the solid solution component in the carrier and the target solid solution when the fuel supply stop control is requested to perform; and suspending the fuel supply stop control to perform if the deviation is equal to or more than the predetermined first threshold value and the temperature of the catalyst is equal to or more than a predetermined second solid solution temperature.

According to the first aspect and the second aspect of the present invention, in an internal combustion engine provided with an exhaust gas purification device that uses a catalyst whose active element forms a solid solution component in a carrier if a temperature of the catalyst is equal to or more than a predetermined first solid solution temperature and an internal atmosphere of the catalyst is an oxidizing atmosphere and whose active element is deposited from the carrier if the temperature of the catalyst is equal to or more than a predetermined deposition temperature and the internal atmosphere of the catalyst is a reducing atmosphere, it is possible to restrict an unexpected change in the purification ability of the catalyst while suppressing the fuel economy deterioration and emission deterioration which follow an intervention to the air-fuel ratio control.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 11 is a view schematically showing a control device of an internal combustion engine which is provided with an exhaust gas purification device that uses a catalyst having an active element.

DETAILED DESCRIPTION OF EMBODIMENTS

Figure 1:
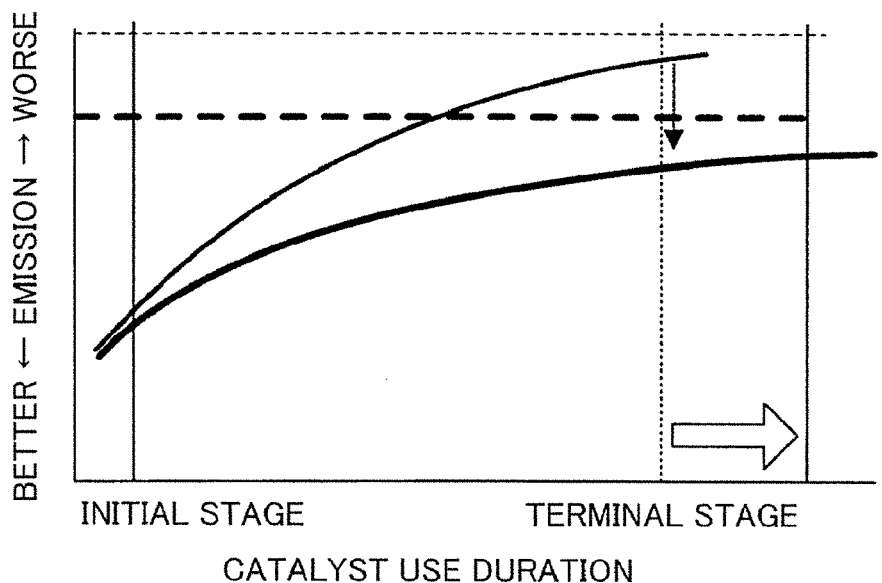
FIG. 1 is a graph that schematically indicates the purification ability transition diagram throughout the useful life (effective life or service life) of an exhaust gas purification catalyst according to a related art.

As describe above, one of the objects of the present invention is to provide a control device of an internal combustion engine which is provided with an exhaust gas purification device that uses a catalyst whose active element forms a solid solution component in a carrier if a temperature of the catalyst is equal to or more than a predetermined first solid solution temperature and if an internal atmosphere of the catalyst is an oxidizing atmosphere and whose active element is precipitated from the carrier if the temperature of the catalyst is equal to or more than a predetermined deposition temperature and if the internal atmosphere of the catalyst is a reducing atmosphere, the control device being capable of restricting an unexpected change in the purification ability of the catalyst while suppressing the fuel economy deterioration and emission deterioration which as associated with an intervention to an air-fuel ratio control.

As a result of our earnest and intensive study, we, the present inventors, have found that, in an FC controllable internal combustion engine provided with an exhaust gas purification device that uses a catalyst whose active element forms a solid solution in a carrier if a temperature of the catalyst is equal to or more than a predetermined first solid solution temperature and if an internal atmosphere of the catalyst is an oxidizing atmosphere and whose active element is precipitated from the carrier if the temperature of the catalyst is equal to or more than a predetermined deposition temperature and if the internal atmosphere of the catalyst is a reducing atmosphere, when the FC control is requested to perform, if a deviation between a solid solubility of an active element in a carrier and a target solid solubility is equal to or more than a predetermined upper limit value and if a catalyst temperature is equal to or more than a predetermined upper limit value, suspending the FC control to perform makes it possible to restrict an unexpected change in the purification ability of the catalyst while suppressing the fuel economy deterioration and emission deteriorations which follow an intervention to an air-fuel ratio control.

That is to say, the first aspect of the present invention is a control device for controlling an internal combustion that includes a control unit configured to perform a fuel supply stop control for stopping a fuel supply to a combustion chamber and an exhaust gas purification device that purifies an exhaust gas emitted from the combustion chamber, the exhaust gas purification device gas including a catalyst that has an active element and a carrier, the active element being served for activating an oxidizing reaction or a reducing reaction of a specific component contained in the exhaust gas, the carrier being served for carrying the active element, and in the catalyst the active element forming a solid solution component in the carrier if a temperature of the catalyst is equal to or more than a predetermined first solid solution temperature and an internal atmosphere of the catalyst is an oxidizing atmosphere, while the active element being deposited from the carrier if the temperature of the catalyst is equal to or more than a predetermined deposition temperature and if the internal atmosphere of the catalyst is a reducing atmosphere, the control unit is characterized to calculate a deviation between a solid solubility that represents the degree the active element forms the solid solution component in the carrier and a target solid solubility, and to suspend the fuel supply stop control to perform if the deviation is equal to or more than a predetermined first threshold value and the temperature of the catalyst is equal to or more than a second solid solution temperature.

As described above, the internal combustion engine in which the internal combustion engine control device is embodied is an internal combustion engine which is capable of performing a fuel supply stop control for stopping the supply of the fuel to the combustion chamber and which includes the exhaust gas purification device that purifies the exhaust gas emitted from the combustion chamber. Here the fuel supply stop control for stopping the supply of the fuel to the combustion chamber means or indicates, for example, the aforementioned fuel cut control (FC control), which keeps the supply amount of the fuel to be supplied to the combustion engine at zero (0) when the internal combustion engine condition is in a specific condition (hereinafter, such a condition is sometimes referred to as "fuel cut permitted condition").

In addition, the exhaust gas purification device, which is provided to the internal combustion engine for purifying an exhaust gas emitted from a combustion chamber in which the internal combustion engine control device according to the present aspect is embodied, is an exhaust gas purification device that uses a catalyst whose active element forms a solid solution component in a carrier if a temperature of the catalyst is equal to or more than a predetermined first solid solution temperature and if an internal atmosphere of the catalyst is an oxidizing atmosphere and whose active element is deposited from the carrier if the temperature of the catalyst is equal to or more than a deposition temperature and the internal atmosphere of the catalyst is a reducing atmosphere. More specifically, the exhaust gas purification device, which is provided to the internal combustion engine in which the internal combustion engine control device according to the present aspect embodied, the exhaust gas purification device gas includes a catalyst that has an active element and a carrier, the active element being served for activating an oxidizing reaction or a reducing reaction of a specific component contained in the exhaust gas, the carrier being served for carrying the active element, wherein in the catalyst the active element forms a solid solution component in the carrier if a temperature of the catalyst is equal to or more than a first solid solution temperature and if an internal atmosphere of the catalyst is an oxidizing atmosphere, while the active element is deposited from the carrier if the temperature of the catalyst is equal to or more than a deposition temperature and the internal atmosphere of the catalyst is a reducing atmosphere.

With reference to FIG. 11, the control device is generally illustrated at 10. The control device 10 includes the control unit 12, the internal combustion engine 14, and the exhaust gas purification device 16. The exhaust gas purification device 16 includes the catalyst 18 having the carrier 20 which supports the active element 22. The control unit 12 is operatively connected to the internal combustion engine 14. The control unit 12 is configured to operate the internal combustion engine 14 to perform and suspend performance of the fuel supply stop control.

The aforementioned catalyst is not limited especially but, for example, when the exhaust gas-fuel ratio of the exhaust gas entering the catalyst is the theoretical exhaust gas-fuel ratio, may be so-called "three-way catalyst" that is capable of purifying concurrently nitrogen oxide (NOx), carbon monoxide (CO), and unburned hydrocarbon (HC) at a high purification rate. It is to be noted that, as is well-known for the skilled person in the art, the exhaust gas-fuel ratio is a ratio of the amount of air fed into the combustion chamber to the amount of fuel supplied to the combustion chamber.

In addition, as the aforementioned active element, whatever element is available as long as it has characteristics of forming a solid solution component in the carrier as described above and depositing from the carrier as described above. Specifically, Rhodium (Rh) is exemplified. Furthermore, as a material that constitutes the carrier, whatever material is available so long as it allows the active element to form a solid solution component as described above and allows the active element to deposit. Specifically, composite oxides can be exemplified that include $MgAl_2O_4$ having Spinel structure and $MAl_2O_3$ (where M is a metal) having Perovskite structure.

The aforementioned first solid solution temperature is a temperature at which the active element can form a solid solution component in the carrier when the internal atmosphere of the catalyst is the oxidizing atmosphere and is determined by the active element that constitutes the catalyst and the material that constitutes the carrier. On the other hand, the aforementioned deposit temperature is a temperature at which the active element can deposit from the carrier when the internal atmosphere of the catalyst is the reducing atmosphere and is determined by the active element that constitutes the catalyst and the material that constitutes the carrier. The first solid solution temperature and the deposit temperature can be confirmed, by previously conducted experiments or other means. It is to be noted that the first solid solution temperature may be same with or different from the deposit temperature.

As described above, in the aforementioned control device that is related to the technology for controlling the internal combustion engine provided with the exhaust gas purification device, in general, the initial purification ability of the catalyst is set to be high in forecast of the possible deterioration thereof with use (which results from, for example, the reduction of the outer surface in accordance with the grain growth due to the aggregation of the active element, and from the proceeding of the active element in formation of the solid solution component), thereby maintaining the purification ability of the catalyst at the desired level throughout its useful life.

However, as described above, during operation of the internal combustion engine, depending on the internal combustion engine operation conditions, the catalyst temperature sometimes reaches the predetermined solid soluble temperature and otherwise reaches the predetermined deposition temperature, thereby causing the exhaust gas-fuel ratio to be richer than the theoretical air-fuel ratio and otherwise to be leaner than the theoretical air-fuel ratio. As a result, the internal atmosphere of the catalyst may be the oxidizing atmosphere and otherwise the reducing atmosphere. Such a reliance on the air-fuel ratio that varies in accordance with the internal combustion engine operation conditions may bring an unexpected change occurs in solid solution of the active element in the catalyst, resulting in possible difficulty in maintaining the purification ability of the catalyst at the desired level throughout its useful life.

In light of the above, regarding the control device that is technically related to the present invention, various attempts have been made in order to control the change of the purification ability of the catalyst by a positive intervention in the air-fuel ratio control being performed depending on the internal combustion engine operation conditions. Indeed the intervention in the air-fuel ratio control whose method is as described below makes it possible to restrict the degradation of the purification ability of the catalyst, however, there is a possible invitation of lowering the fuel efficiency and emission as improvement effects attained by performing the air-fuel ratio control, the method of the air-fuel ratio being that if the solid solution of the in-catalyst active element gets extremely high which results from the air-fuel ratio control depending on the internal combustion engine operation conditions, irrespective of the air-fuel ratio control depending on the internal combustion engine operation conditions, the air-fuel ratio is caused to be richer than the theoretical air-fuel ratio, while if the solid solution of the in-catalyst active element gets extremely low which results from the air-fuel ratio control depending on the internal combustion engine operation conditions, irrespective of the air-fuel ratio control depending on the internal combustion engine operation conditions, the air-fuel ratio is caused to be leaner than the theoretical air-fuel ratio, which makes it possible to restrict the deterioration of the purification ability of the catalyst.

In particular, in a case where the internal combustion engine under the control of the FC control that is performed to adjust the exhaust gas-fuel ratio to be leaner than the theoretical air-fuel ratio, there is a possibility of an extreme increase of the solid solution of the in-catalyst active element associated with the performance of the FC control. In case of an extreme increase of the solid solution of the in-catalyst active element, it is necessary to lower the solid solution of the in-catalyst active element by performing an intervention in the air-fuel control for adjusting the exhaust gas-fuel ratio to be richer than the theoretical air-fuel ratio. As a result, even the FC control improves the fuel efficiency, such an intervention in the air-fuel control (enriching the exhaust gas-fuel ratio) has a possibility of the deterioration of the fuel efficiency and/or the emission. In other words, in order that an unexpected change does not occur in the purification ability of the in-catalyst with the deteriorations of the fuel efficiency and emission suppressed, it is important to prevent that the solid solution of the active element in the catalyst that is associated with the FC control gets extremely higher in temperature.

In light of the preceding description, the internal combustion engine control device according to the present aspect, in the above-constructed control of the internal combustion engine having the exhaust gas purification device, upon request of the fuel supply stop control to perform, calculates the deviation between the solid solubility of the active element that represents the degree the active element forms the solid solution component in the carrier and the target solid solubility. And, the internal combustion engine control device according to the present aspect suspends the fuel supply stop control to perform, if the deviation is equal to or more than the predetermined first threshold value and the catalyst temperature is equal to or more than the predetermined second solid soluble temperature.

In the internal combustion engine control device according to the present aspect, the solid solubility that represents the degree the active element forms the solid solution component in the carrier at the time when the fuel supply stop control is requested to perform is an indication of what percentage of the active element in the in-catalyst forms the solid solution component in the carrier. How to find the solid solubility is not particularly limited, and, for example, a sensor that detects a solid solution of the in-catalyst active element and calculation or estimation based on various parameters that are associated with the internal combustion engine are available.

In the latter case, the solid solubility of the active element in the catalyst at any time instant may be calculated based on the transition records, up to this time instant, of the catalyst temperature and the exhaust gas-fuel ratio. In this method, the solid solubility of the active element may be found in such a manner that the calculated solid solubility is increased if the catalyst temperature is equal to or more than the second solid solution temperature and the exhaust gas ratio is leaner air-fuel ratio than the theoretical air-fuel ratio, while the calculated solid solubility is decreased if the catalyst temperature is equal to or more than the second solid solution temperature and the exhaust gas ratio is richer air-fuel ratio than the theoretical air-fuel ratio. In addition, the resulting increase range of the solid solubility may be set to become larger as the catalyst temperature and the exhaust gas-fuel ratio become higher and larger, respectively, while the resulting decrease range of the solid solubility may be set to become larger as the catalyst temperature and the exhaust gas-fuel ratio become higher and smaller, respectively.

It is to be noted that for calculating the solid solubility of the active element in the catalyst at any time instant according to the aforementioned way, an exemplary procedure may be available in which the increase and decrease ranges of the calculated solid solubility, which are corresponded to, for example, combinations of various catalyst temperatures and exhaust gas-fuel ratio, are prepared in the form of, for example, a data table (map) or a function, the catalyst temperature and the exhaust gas-fuel ratio are detected at a given cycle, the increase and decrease ranges of the calculated solid solubility, which correspond to the combinations of the various catalyst temperatures and exhaust gas-fuel ratios, are identified based on the data table (map) or the function, and thus identified increase and decrease ranges of the calculated solid solubility are integrated to find the solid solubility of the active element in the catalyst at any time instant.

Figure 2:
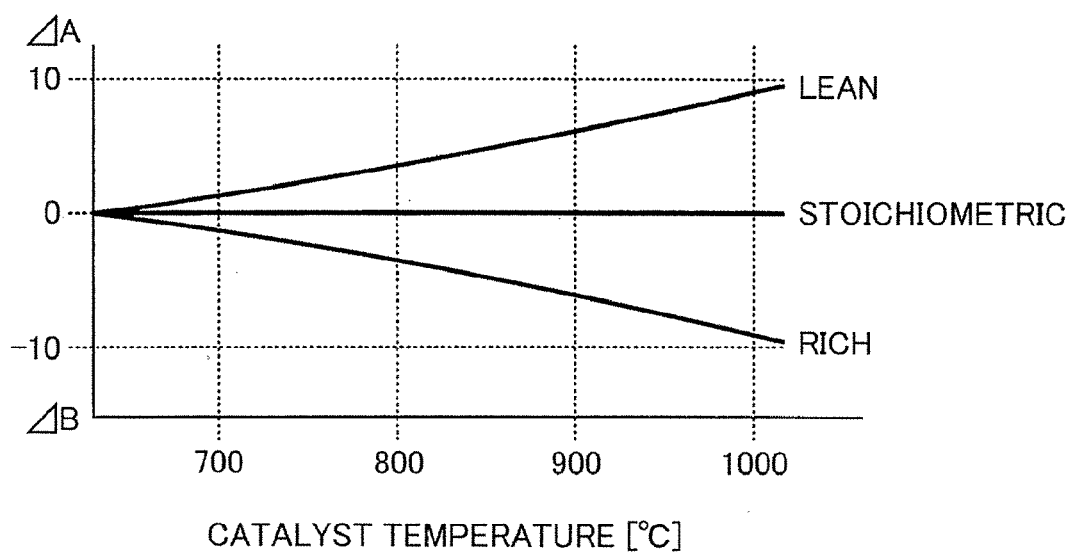
FIG. 2 is a graph that schematically represents increase and decrease ranges of a solid solution of an active element in the catalyst that correspond to various combinations a catalyst temperature and an exhaust gas-fuel ratio.

Here, regarding the data table (map) or the function in which are prepared the increase and decrease ranges of the calculated solid solution which are corresponded to the detected catalyst temperatures and exhaust gas-fuel ratios, hereinbelow, a detailed explanation will be made with reference to the attached drawing. As described previously, FIG. 2 is a graph that schematically represents the increase and decrease ranges of the calculated solid solubility which are corresponded to the combinations of the detected catalyst temperatures and exhaust gas-fuel ratios. In the graph depicted in FIG. 2, an abscissa represents the catalyst temperature, while a ordinate represents the increase range ($\Delta A$) and the decrease range ($\Delta B$) of the calculated solid solubility that are set to be positive and negative values, respectively. In addition, in examples shown in FIG. 2, absolute values of the increase range ($\Delta A$) and the decrease range ($\Delta B$) are set to get larger as the catalyst temperature gets higher. It is to be noted that, though, in the graph in FIG. 2, a single curve is depicted for representing each of the correspondence between the increase range ($\Delta A$) and the catalyst temperature when the exhaust gas-fuel ratio is lean and the decrease range ($\Delta B$) and the catalyst temperature when the exhaust gas-fuel ratio is rich, plural curve lines may be plotted for representing correspondences at various exhaust gas-fuel ratios.

Figure 3:
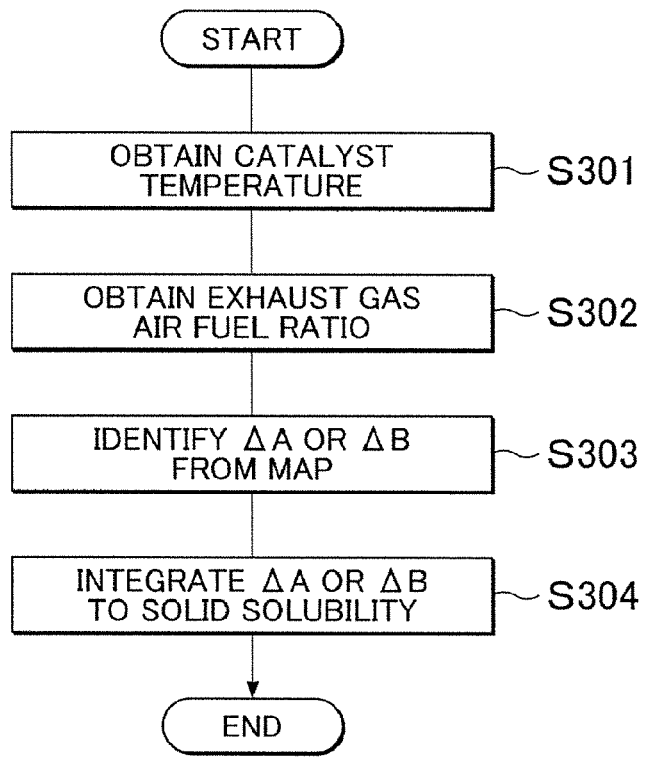
FIG. 3 is a flowchart in which the increase and decreasing ranges of the solid solubility of the active element in the catalyst is identified on the basis of the catalyst temperature and the exhaust gas-fuel ratio detected at a specific time instant and the resulting increased and decreased ranges are integrated to calculate the solid solubility of the active element in the catalyst at the specific time instant.

Next, regarding a process for calculating the solid solubility of the active element in the catalyst at a specific time instant based on the correspondences, at various exhaust gas-fuel ratios, between each of the increase range ($\Delta A$) and the decrease range ($\Delta B$) and the catalyst temperature, a detailed explanation is made hereinbelow with reference to FIG. 3. As previously described, FIG. 3 is a flowchart in which the increase and decreasing ranges of the solid solubility of the active element in the catalyst is identified on the basis of the catalyst temperature and the exhaust gas-fuel ratio detected at a specific time instant and the resulting increased and decreased ranges are integrated to calculate the solid solubility of the active element in the catalyst at the specific time instant. As illustrated in FIG. 3, at first, a catalyst temperature is obtained at Step S301 at a specific time instant. This catalyst temperature may be directly detected by, for example, a detecting device such as a temperature sensor that is provided in or near the catalyst. Otherwise, this catalyst temperature may be obtained indirectly by calculation or estimation based on, for example, the temperature of the exhaust gas.

Next, at Step S302, an exhaust gas-fuel ratio at the specific time instant is obtained. This exhaust gas-fuel ratio may be detected by using a detecting device such as an air-fuel ratio sensor that is provided in an exhaust passage through which the exhaust gas emitted from the internal combustion engine. Then, at Step S303, the increase range ($\Delta A$) or the decrease range ($\Delta B$) of the calculated solid solubility of the active element in the catalyst is identified based on the data table (map) or the function to which the catalyst temperature and the exhaust gas-fuel ratio which are obtained at Step 301 and Step 302, respectively. Subsequently, at Step 304, the calculated solid solubility is added with the increase range ($\Delta A$) or the decrease range ($\Delta B$) identified at Step S303. The aforementioned routine is executed every time a predetermined time duration elapses, which updates the calculated solid solubility of the active element in the catalyst every time the predetermined time duration elapses, thereby treating the updated solid solubility of the active element in the catalyst as a currently or the latest solid solubility of the active element in the catalyst.

The control device of the internal combustion engine according to the present aspect, by, for example, the aforementioned method, calculates the deviation between the solid solubility of the active element in the catalyst and the target solid solubility at the time when the fuel supply stop control is requested to perform. Here, the target solid solubility can be determined properly so that the catalyst can develop its desired purification ability depending on how the active element and the material are combined both of which constitute the catalyst and the structure of the catalyst (for example, the particle diameter of the active element carried in the carrier). The target solid solubility may be set to be at a constant value throughout the useful life and otherwise may be set to get smaller as the use duration gets longer.

In general, in a case where an amount of the active element that can develop a catalyst function (i.e., an amount of the active element that deposits from the carrier) remains unchanged, the purification ability of the catalyst tends to degrade as the catalyst use duration gets longer. Thus, in order to maintain the desired purification ability throughout the use duration, it is desired to increase the amount of the active element that deposits from the carrier as the use duration of the catalyst gets longer by setting the target solid solubility to get smaller as the use duration of the catalyst gets longer and subsequently controlling the solid solubility of the active element in the catalyst to achieve the resulting target solid solubility.

Figure 4:
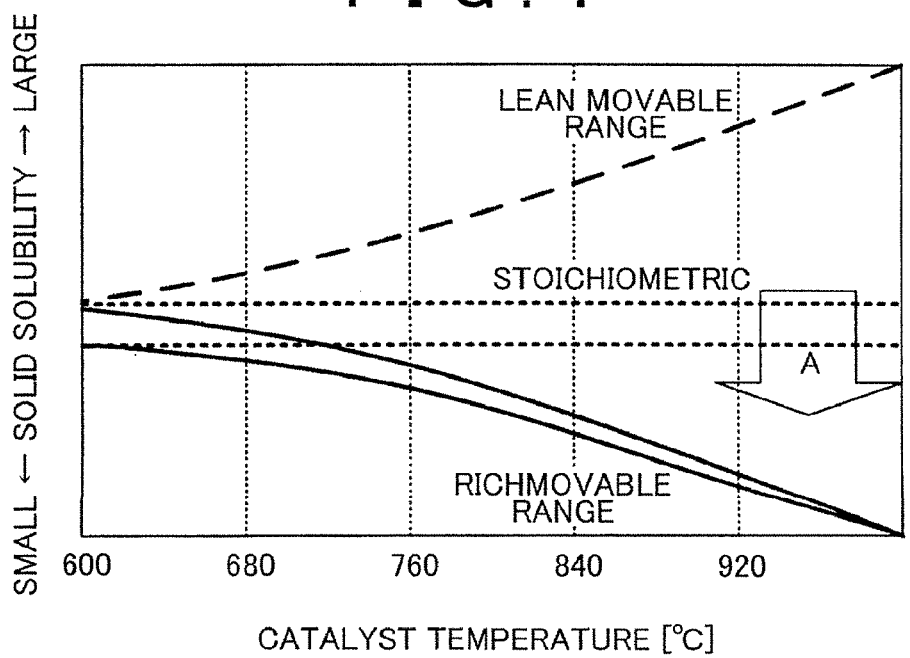
FIG. 4 is a graph that schematically represents a balanced value (convergent value) of the active element in the catalyst at various catalyst temperatures while the exhaust gas-fuel ratio is rich, lean, and stoichiometric (theoretical)
Figure 5:
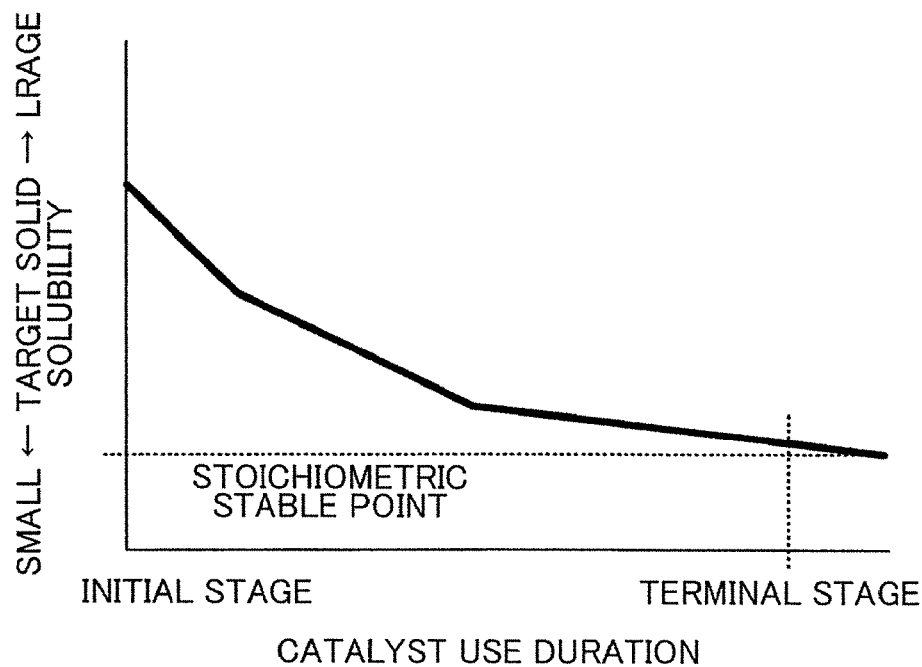
FIG. 5 is a graph that schematically represents a relationship between a set value of a target solid solubility and a stoichiometric stable point throughout the useful life.

Here, regarding the relationship between the catalyst temperature, the surrounding atmosphere of the catalyst (corresponding to the exhaust gas-fuel ratio), and the solid solubility of the active element in the catalyst, an explanation will be made hereinbelow in detail with reference to the attached drawing. FIG. 4 is, as previously described, a graph that schematically represents a balanced value (convergent value) of the active element in the catalyst at various catalyst temperatures while the exhaust gas-fuel ratio is rich, lean, and stoichiometric (theoretical). In other words, FIG. 4 is a graph that schematically illustrate a variable range of the solid solubility when the exhaust gas-fuel ratio is rich, a variable range of the solid solubility when the exhaust gas-fuel ratio is lean, and the convergent value of the solid solubility is stoichiometric, all of which are at various temperatures of the catalyst.

In the graph shown in FIG. 4, an abscissa represents a catalyst temperature, while an ordinate represents the solid solubility of the active element in the catalyst. Thai is to say, as the value on the ordinate gets larger, the solid solution gets larger (the emission becomes worse and worse), while as the value on the ordinate gets smaller, the solid solubility gets smaller (the emission becomes better and better). In addition, examples in FIG. 4 employ Rhodium (Rh) as the active element and $MgAl_2O_4$ having Spinel structure as the raw material of the carrier, and the particle diameter or size is set to be relatively larger (for example, 5 nm or above).

As plotted in the dotted line in FIG. 4, when the exhaust gas-fuel ratio is stoichiometric, irrespective of the catalyst temperature, the solid solubility converges at a fixed stable value (hereinafter, such a value of the solid solubility is sometimes referred to as "stoichiometric stable point"). However, in a case of the catalyst temperature being low, under which the redox speed of the active element gets lower when compared to the case of high catalyst, the time required for the solid solubility to converge gets longer. As indicated by the arrow-A in FIG. 4, it is recognized that the solid solution on the stoichiometric stable point gets gradually lower as the use duration of the catalyst gets longer.

In comparison to the above, when the exhaust gas-fuel ratio is rich as indicated by the solid line in FIG. 4, the solid solubility converges at a value that is smaller than the stoichiometric stable point. The divergence degree of this convergence value from the stoichiometric stable point gets larger as the catalyst temperature gets higher. On the other hand, when the exhaust gas-fuel ratio is lean as indicated by the dotted line in FIG. 4, the solid solubility converges at a value that is larger than the stoichiometric stable point. The divergence degree of this convergence value from the stoichiometric stable point gets larger as the catalyst temperature gets higher.

In this way, while the internal combustion engine is in operation, the solid solubility of the active element in the catalyst varies between the lower limit and the upper limit which are depicted by the solid line and the dotted line, respectively, in FIG. 4, depending every time on the catalyst temperature and the exhaust gas-fuel ratio. In addition, when the exhaust gas-fuel ratio is stoichiometric, the solid solubility has a tendency to converge at the stoichiometric stable point. As a result, when the target solid solubility is set to be lower than the stoichiometric stable point, even though the control causes the solid solubility to be in coincidence with the target solid solubility, except that the exhaust gas-fuel ratio is rich or lean (i.e., in a case where the exhaust gas-fuel ratio is stoichiometric), the solid solubility varies naturally to a higher solid solubility (stoichiometric stable point) than the target solid solubility, resulting in that the solid solubility is apt to get higher than the target solid solubility. On the other hand, when the target solid solubility is set to be higher than the stoichiometric stable point, after the control causes the solid solubility to be in coincidence with the target solid solubility, if exhaust gas-fuel ratio is neither rich nor lean (i.e., if the exhaust gas-fuel ratio is stoichiometric), the solid solubility varies naturally to a lower solid solubility (stoichiometric stable point) than the target solid solubility, resulting in that the solid solubility is apt to get lower than the target solid solubility. Thus, as mentioned above, in a case where the target solid solubility is so set as to get smaller as the use duration of the catalyst gets longer, it is desirable to set the target solid solubility to be higher than the stoichiometric stable point.

As described above, the control device of the internal combustion engine according to the present aspect, calculates the deviation between the solid solubility of the active element in the catalyst that is to be calculated at a time instant as described above and the target solid solubility that is set as described above. The deviation between the solid solubility at the time instant and the target solid solubility can be calculated by subtracting the target solid solubility from the solid solubility. Thus, if the solid solubility is larger than the target solid solubility, the resulting deviation is of a positive value, while if the solid solubility is smaller than the target solid solubility, the resulting deviation is of a negative value.

Next, the control device of the internal combustion engine according to the present aspect, as described above, suspends the performance of the fuel supply stop control, if the deviation is not less than the predetermined first threshold value and the catalyst temperature is not less than the predetermined second solid solution temperature.

In the above, the first threshold value is the lower limit of the permissible deviation between the solid solubility of the active element in the catalyst and the target solid solubility. In other words, it can understand that the predetermined first threshold value is the value which corresponds to the lower limit value of the permissible range of the solid solubility of the active element in the catalyst which is to be controlled to be in coincidence with the target solid solubility. For example, when the deviation between the solid solubility and the target solid solubility is calculated by subtracting the target solid solubility from the solid solubility, typically, the first threshold value is of a negative value. A concrete value of the first threshold value can be determined, by, for example, previously conducted experiments in which the solid solubility range that enable the catalyst to function an initially expected purification ability, depending on, for example, how the active element and the material are combined both of which constitute the catalyst and the structure of the catalyst (for example, the particle diameter of the active element carried in the carrier).

In addition, in the above, the second solid solution temperature is a temperature at which the active element is judged to form a solid solution component in the carrier in a case where the catalyst temperature exceeds this temperature and the internal atmosphere of the catalyst is the oxidizing atmosphere and is determined by the active element constituting the catalyst and the raw material of the carrier. The second solid solution temperature can be confirmed by, for example, previously conducted experiments. It is to be noted that the second solid solution temperature may be same with or different from the aforementioned first solid solution temperature. In detail, the second solid solution temperature can be, for example, a temperature that is equal to or more than the minimum value of the aforementioned first solid solution temperature. In this case, for example, instead of improving the fuel efficiency and emission by performing the fuel supply stop control, if a priority is requested to restrict a further increase of the solid solubility that is achieved by performing the air-fuel ratio control in which the exhaust gas-fuel ratio is adjusted to the theoretical air-fuel ratio for a predetermined time duration prior to an initiation of the performance of the fuel supply stop control, it is possible to set the second solid solution temperature to be same with or close to the minimum value of the first solid solution temperature. On the other hand, for example, instead of acceptance of fully satisfactory effect resulting from restricting a further increase of the solid solubility that is achieved by performing the air-fuel ratio control in which the exhaust gas-fuel ration is adjusted to the theoretical air-fuel ratio for a predetermined time duration prior to an initiation of the performance of the fuel supply stop control, if suppressing the deteriorations of the fuel efficiency and emission that are associated with the control concerned, it is possible to set the second solid solution temperature to be higher than the minimum value of the first solid solution temperature.

In summary, the control device of the internal combustion engine according to the present aspect suspends the performance of the fuel supply stop control, if the deviation is not less than the predetermined first threshold value and the catalyst temperature is not less than the second solid solution temperature. The condition under which the deviation between the solid solubility of the active element in the catalyst and the target solid solubility is not less than the first threshold indicates that the solid solubility of the active element in the catalyst is not less than the lower limit value of the permissible range. In addition, the condition under which the catalyst temperature is not less than the second solid solution temperature indicates that when the exhaust gas-fuel ratio comes to be lean, the forming of the solid solution of the active element in the carrier proceeds, thereby increasing the solid solubility of the active element in the catalyst. Thus, if the fuel supply stop control is initiated immediately upon establishment of the condition under which the deviation is not less than the predetermined first threshold and the catalyst temperature is not less than the second solid solution temperature, the solid solubility that has been not less than the lower limit value of the permissible range is caused to increase, which may result in that the solid solubility deviates from the permissible range.

However, as described above, the control device of the internal combustion engine according to the present aspect, suspends the performance of the fuel supply stop control, if the deviation is not less than the predetermined first threshold value and the catalyst temperature is not less than the second solid solution temperature.

Thereby, the performance of the fuel supply stop control is suspended, if the deviation is not less than the predetermined first threshold value and the catalyst temperature is not less than the second solid solution temperature, which slightly lowers the improvement effects on the fuel efficiency and emission, but which makes it possible to restrict a further increase, as is seen upon immediate performance of the fuel supply stop control, of the solid solubility that has been not less than the lower limit value of the permissible range. As a result, it is possible to restrict the degradation of the purification ability of the catalyst due to the excess increase of the solid solubility of the active element in the catalyst. In addition, such a restriction of the excess increase of the solid solubility will decrease the frequency of excessively supplying the fuel to the internal combustion engine for making the exhaust gas-fuel ratio rich, thereby suppressing the deteriorations of the fuel efficiency and emission.

It is to be noted that the control device of the internal combustion engine according to the present embodiment is capable of repeating the performance of the aforementioned solid solution control with a fixed period. For example, it is possible to perform the solid solution control in a repeated manner at a given cycle by the following procedures: Storing a program in which an algorithm for performing the solid solution control in data storage devices provided to the control device that includes, for example, ROM (Read Only Memory), RAM (Random Access Memory), HDD (HARD Disk Drive), causing a central processing unit (CPU) to execute various operations in accordance with the algorithm.

Incidentally, in the internal combustion engine to which the control device according to the present aspect, when the immediate performance of the fuel supply stop control is initiated in response to the request for performing the fuel supply stop control under the condition that the active element's solid solubility in the carrier is excessively exceeds the upper limit value of the permissible range, the active element being in the catalyst that is provided in the exhaust gas purification device under the control of the present control device, the solid solubility of the active element in the catalyst which has been at an excessive high level is caused to further increase, thereby causing the solid solubility to deviate from the permissible range. Thus, in such a case, under the condition that the internal atmosphere of the catalyst is the oxidizing atmosphere and the catalyst temperature has reached a temperature not less than the temperature at which the active element is capable of forming a solid solution in the carrier (i.e., the second solid solution temperature), an ensure should be essential to suspend the performance of the fuel supply stop control. In other words, it should be ensured that the performance of the fuel supply stop control is withheld until the catalyst temperature gets lower less than the second solid solution temperature.

Thus, the second aspect of the present invention characterizes the control device of the internal combustion engine according to the first aspect of the present invention by enabling to perform an air-fuel ratio control, during a predetermined first period prior to an initiation of the fuel supply stop control, in order that an air-fuel ratio of the exhaust gas entering the catalyst comes to be a theoretical air-fuel ratio, upon request to perform the fuel supply stop control, if the deviation is equal to or more than a predetermined second threshold value that is more than the predetermined first threshold value and if the temperature of the catalyst is equal to or more than the second solid solution temperature.

As described above, the control device of the internal combustion engine according to the present of the present aspect performs an air-fuel ratio control, during the predetermined first period prior to the initiation of the fuel supply stop control, in order that the air-fuel ratio of the exhaust gas entering the catalyst comes to be the theoretical air-fuel ratio, upon request to perform the fuel supply stop control, if the deviation is equal to or more than a predetermined second threshold value that is more than the predetermined first threshold value and if the temperature of the catalyst is equal to or more than the second solid solution temperature (hereinafter, such an air-fuel ratio control is, sometimes, referred to as "stoichiometric control").

In the foregoing description, the second threshold value is an upper limit value of an allowable deviation between the solid solubility of the active element in the catalyst and the target solid solubility. In other words, the second threshold value can be said to be a value that can be corresponded to an upper limit value of a permissible range of the solid solubility, which is controlled to be same with the target solid solubility, of the in-catalyst active element. For example, as described above, when the deviation between the solid solubility and the target solid solubility is calculated by subtracting the target solid solubility from the solid solubility, the second threshold value is typically a positive value. A concrete value of the second threshold value, similar to the first threshold value, can be determined, by, for example, previously conducted experiments in which the solid solubility range that enable the catalyst to function an initially expected purification ability, depending on, for example, how the active element and the material are combined both of which constitute the catalyst and the structure of the catalyst (for example, the particle diameter of the active element carried in the carrier).

Thus, the control device of the internal combustion engine according to the present aspect performs the air-fuel ratio control in order to make the exhaust gas-fuel ratio or the air-fuel ratio of the exhaust gas entering the catalyst to be in coincidence with the theoretical air-fuel ratio during the predetermined first duration prior to the time instant at which the performance of the fuel supply stop control is initiated, in a case where the deviation is not less than the predetermined second threshold value and the catalyst temperature is not less than the predetermined second solid solution temperature. The condition under which the deviation between the solid solubility and the target solid solubility is not less than the second threshold value means that the solid solubility of the active element in the catalyst is extremely high. In addition, the condition under which the catalyst temperature is not less than the second solid solution temperature means that when the exhaust gas-fuel ratio is lean, the solid solution of the in-catalyst active element in the carrier proceeds, thereby causing the solid solubility of the in-catalyst active element to further increase. Thus, in a case where the deviation is not less than the predetermined second threshold value and the catalyst temperature is not less than the second solid solution temperature, an immediate performance of the fuel supply stop control results in a possible further increase of the solid solubility of the in-catalyst active element.

Figure 6:
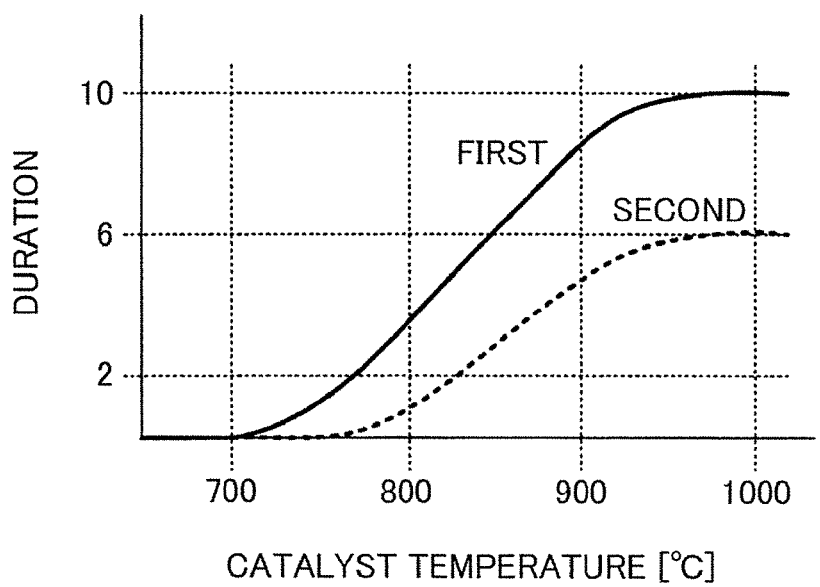
FIG. 6 is a graph that schematically represents, in a control device of an internal combustion engine according to an aspect of the present invention, a length of period and the catalyst temperature, the period being required for an air-fuel control to set the exhaust gas-fuel ratio to be the theoretical air-fuel ratio before an FC control is performed, in a case where the solid solubility of the active element in the carrier and the catalyst temperature met specific conditions when the FC control is requested to perform.

However, as described above, the control device of the internal combustion engine according to the present aspect performs the air-fuel ratio control in order to make the exhaust gas-fuel ratio or the air-fuel ratio of the exhaust gas entering the catalyst, to be in coincidence with the theoretical air-fuel ratio during the predetermined first duration prior to the time instant at which the performance of the fuel supply stop control is initiated, in a case where the deviation is not less than the predetermined second threshold value and the catalyst temperature is not less than the predetermined second solid solution temperature. Here, the first duration can be defined as a value corresponding to a length the duration that is required for the catalyst temperature to lower below less than the second solid solution temperature. In such a case, as the solid line plotted in the graph of FIG. 6, the concrete value of the first duration (the length of duration) can be set to get larger and larger (longer and longer) as the catalyst temperature gets higher and higher at the time instant when the performance of the fuel supply stop control is requested to suspend.

Thereby, in a case where the deviation is not less than the second threshold value and the catalyst temperature is not less than the second solid solution temperature, the performance of the fuel supply stop control is allowed to initiate subject to the fact that the catalyst temperature drops down sufficiently (to, for example, less than the second solid solution temperature), which causes the improvement effects of fuel efficiency and the emission by the fuel supply stop control to lower slightly, but which makes it possible to restrict a further increase of the solid solubility of the active element in the catalyst that has been already at a high level, such a further increase being seen when at the immediate performance of the fuel supply stop control. As a result, it is possible to restrict the extreme degradation of the purification ability of the catalyst, resulting from a further increase of the solid solubility of the active element in the catalyst. Furthermore, such a restriction of the excess increase of the solid solubility will decrease the frequency of excessively supplying the fuel to the internal combustion engine for making the exhaust gas-fuel ratio rich, thereby suppressing the deteriorations of the fuel efficiency and emission.

Incidentally, as described above, the second threshold value is the upper limit value of the permissible deviation between the solid solubility of the active element in the catalyst and the target solid solubility, while the first threshold value is the lower limit value of the permissible deviation between the solid solubility of the active element in the catalyst and the target solid solubility. Thus, if the deviation between the solid solubility of the active element in the catalyst and the target solid solubility, at the time when the performance of the fuel supply stop control is requested to initiate, is not less than the first threshold value and is less than the second threshold value, it is possible to determine that the deviation concerned falls within the permissible range. That is to say, in such a case, differently from the case of the deviation being not less than the second threshold value, the solid solubility is not excessively high and therefore, even if the catalyst temperature is not less than the second solid solution temperature, the length of the duration during which the stoichiometric control (the control for setting the air-fuel ratio of the exhaust gas entering the catalyst to be same with the theoretical air-fuel ratio) is being performed prior to the request of the performance of the fuel supply stop control, while differently from the case of the deviation being less than the first threshold value, the solid solubility is not excessively low, resulting in that the solid solubility may be caused to increase in association with a great deviation from the target solid solubility in a case where an immediate performance of the fuel supply stop control is initiated when the catalyst temperature is not less than the second solid solution temperature.

Thus, it is desirable to perform the stoichiometric control during the second duration that is set to be shorter than the first duration prior to the initiation of the performance of the fuel supply stop control, in a case where, when the performance of the fuel supply stop control is requested to initiate, the deviation between the solid solubility of the active element in the catalyst and the target solid solubility is not less than the first threshold value and less than the second threshold value and the catalyst temperature is not less than the second solid solution temperature.

On the other hand, in a case where, when the performance of the fuel supply stop control is requested to initiate, the deviation between the solid solubility of the active element in the catalyst and the target solid solubility is less than the first threshold value, it is possible to concluded that the deviation concerned is at a lower point less than the permissible range (i.e., deviates to the lower side of the permissible range). That is to say, due to the fact that in such a case, the solid solubility is extremely low, providing the duration for performing the stoichiometric control may be brought into association with missing a chance in which the solid solubility is increased to fall within the permissible range (i.e., to approach the target solid solubility). Thus, when the deviation is less than the predetermined first threshold value, it is desired to initiate the performance of the fuel supply stop control in order to increase the solid solubility of the active element in the catalyst which has already been in an extremely low level.

That is to say, the third aspect of the present invention is to characterize the control device of the internal combustion engine according to one of the first aspect and the second aspect of the present invention by enabling to perform the air-fuel ratio control, during a predetermined first period prior to an initiation of the fuel supply stop control, in order that an exhaust gas air-fuel ratio, which is an air-fuel ratio applied to the exhaust gas entering the catalyst, comes to be a theoretical air-fuel ratio, in a case where when the control unit is requested to perform the fuel supply stop control, the deviation is equal to or more than a predetermined second threshold value that is more than the predetermined first threshold value and the temperature of the catalyst is equal to or more than the second solid solution temperature, to perform then air-fuel ratio control, during a predetermined second period that is shorter than the predetermined first period prior to an initiation of the fuel supply stop control, in order that an exhaust gas air-fuel ratio, which is an air-fuel ratio applied to the exhaust gas entering the catalyst, comes to be a theoretical air-fuel ratio, in a case where the deviation is equal to or more than the predetermined first threshold value and is less than the predetermined second threshold value, and not to suspend the fuel supply stop control to perform in a case where the deviation is less than the predetermined first threshold value.

As described above, the control device of the internal combustion engine according to the present aspect performs the air-fuel ratio control, during the predetermined first period prior to an initiation of the fuel supply stop control, in order that the exhaust gas air-fuel ratio, which is the air-fuel ratio applied to the exhaust gas entering the catalyst, comes to be the theoretical air-fuel ratio, in a case where when the control unit is requested to perform the fuel supply stop control, the deviation is equal to or more than the predetermined second threshold value that is more than the predetermined first threshold value and the temperature of the catalyst is equal to or more than the second solid solution temperature. In this respect, the control device of the internal combustion engine is similar to the control device of the internal combustion engine according to the second aspect. However, in addition to the aforementioned feature, the control device of the internal combustion engine performs the air-fuel ratio control, during the predetermined second period that is shorter than the predetermined first period prior to the initiation of the fuel supply stop control, in order that the exhaust gas air-fuel ratio, which is an air-fuel ratio applied to the exhaust gas entering the catalyst, comes to be the theoretical air-fuel ratio, in a case where the deviation is equal to or more than the predetermined first value and is less than the predetermined second threshold value, and not to suspend the fuel supply stop control to perform in a case where the deviation is less than the predetermined first threshold value.

That is to say, the control device of the internal combustion engine according to the present aspect performs the air-fuel ratio control in order to make the exhaust gas-fuel ratio to be in coincidence with the theoretical air-fuel ratio during the predetermined first duration prior to the time instant at which the performance of the fuel supply stop control is initiated, in a case where the deviation is not less than the predetermined second threshold value (i.e., the solid solubility is extremely high) and the catalyst temperature is not less than the predetermined second solid solution temperature.

Thereby, in a case where the deviation is not less than the second threshold value and the catalyst temperature is not less than the second solid solution temperature, the performance of the fuel supply stop control is allowed to initiate subject to the fact that the catalyst temperature drops down sufficiently (to, for example, less than the second solid solution temperature) causes the improvement effects of fuel efficiency and the emission by the fuel supply stop control to lower slightly, but can restrict a further increase of the solid solubility of the active element in the catalyst that has been already at a high level, such a further increase being seen when at the immediate performance of the fuel supply stop control. As a result, it is possible to restrict the extreme degradation of the purification ability of the catalyst, resulting from a further increase of the solid solubility of the active element in the catalyst. Furthermore, such a restriction of the excess increase of the solid solubility will decrease the frequency of excessively supplying the fuel to the internal combustion engine for making the exhaust gas-fuel ratio rich, thereby suppressing the deteriorations of the fuel efficiency and emission.

On the other hand, as described above, the control device of the internal combustion engine according to the present aspect, performs the air-fuel ratio control, during the predetermined second period that is set to be shorter than the predetermined first period prior to an initiation of the fuel supply stop control, in order that the exhaust gas air-fuel ratio, which is an air-fuel ratio applied to the exhaust gas entering the catalyst, comes to be a theoretical air-fuel ratio, in a case where the deviation is equal to or more than the predetermined first threshold value and is less than the predetermined second threshold value and the catalyst temperature is equal to or more than the second solid solution temperature. Thus, in the control device of the internal combustion engine according to the present aspect, the value of the second duration is set to be a shorter than that of the first duration.

Here, similar to the first duration, the second duration can be defined, as a value that is corresponded to a duration that is required for the catalyst temperature to decrease below less than the second solid solution temperature, while, for example, the exhaust gas-fuel ratio is being controlled to be stoichiometric and the fuel supply to the internal combustion engine is being continued. In such a case, the concrete value of the second duration (the length of duration), similar to the first duration, may be set to get larger and larger (longer and longer) as the catalyst temperature gets higher and higher, as indicated by the dotted line plotted in the graph of FIG. 6.

Thereby, during the predetermined second period prior to the initiation of the performance of the fuel supply stop control, the air-fuel ratio control is performed in order that the exhaust gas air-fuel ratio comes to be the theoretical air-fuel ratio, in a case where the deviation is equal to or more than the predetermined first threshold value and is less than the predetermined second threshold value and currently the catalyst temperature is equal to or more than the second solid solution temperature. In such a case, since the second duration is set to be shorter than the first duration, which results in a relatively lower effect of suppressing the further increase of the solid solubility of the active element in the catalyst, when compared to the first duration during which the air-fuel ratio control is performed in order that the exhaust gas air-fuel ratio comes to be the theoretical air-fuel ratio. However, as described above, the deviation is not so extremely high such that the deviation is not less than the second threshold value, which makes it possible to minimize the delay of the initiation of the fuel supply stop control, with an increase of the solid solubility to some extent permitted.

Furthermore, as described above, the control device of the internal combustion engine according to the present aspect does not suspend to perform the fuel supply stop control, if the deviation is less than the first threshold value. Thereby, in a case where the deviation between the solid solubility and the target solid solubility is less than the first threshold value (i.e., the solid solubility of the active element in the catalyst is extremely low), the fuel supply stop control is immediately initiated to perform. As a result, when the catalyst temperature is not less than the second solid solution temperature, it is possible to increase the solid solubility, which has been at an extremely low level, of the active element in the catalyst.

In this way, the control device of the internal combustion engine according to the present aspect makes it possible to maintain the solid solubility of the active element in the catalyst, throughout the useful life, in the vicinity of the target solid solubility, while suppressing the deteriorations of the fuel efficiency and emission associated with the intervention in the air-fuel ratio control. In other words, the control device of the internal combustion engine according to the present aspect makes it possible to achieve compatibility, at a higher level, between the suppression of the degradation of the purification ability that is associated with maintaining the solid solubility of the active element in the catalyst in the vicinity of the target solid solubility and the improvements of the fuel efficiency and emission resulted from the performance of the fuel supply stop control. In addition, as described above, controlling the solid solubility of the active element in the catalyst to approach the target solid solubility temperature that is so set as to get smaller as the use duration of the catalyst gets longer will increase the amount of the active element that is deposited from the carrier as the use duration of the catalyst gets longer, which makes it possible to maintain the purification ability at the desired level throughout the useful life or increase the purification ability gradually as the use duration of the catalyst gets longer.

Figure 7:
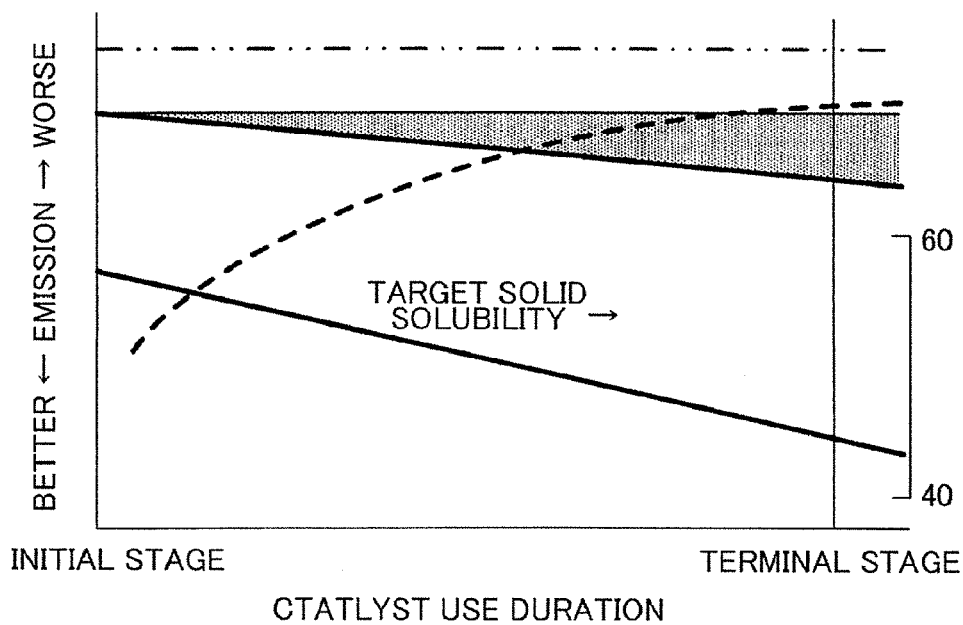
FIG. 7 is a graph that schematically represents how the emission changes throughout the useful life when a deposit amount of the active element from the carrier is increased as the use period of the catalyst gets longer by setting the target solid solubility of the active element to be smaller as the use period of the catalyst gets longer.

Here, regarding the above description, an explanation will be detailed, hereinbelow, with reference to the attached drawing. FIG. 7 is a graph, as described above, that schematically represents how the emission changes throughout the useful life in a case of increasing the amount of the active element that is deposited from the carrier as the use duration of the catalyst gets longer after setting the target solid solubility to get smaller as the use duration of the catalyst gets longer. In the graph in FIG. 7, an abscissa represents the use duration of the catalyst (for example, mirage is available when the internal combustion engine is mounted on an automotive vehicle), an ordinate on the left side towards the sheet represents a content of the specific component in the exhaust gas (emission), and a ordinate on the right side towards the sheet represents the target solid solubility.

At first, the dotted line in FIG. 7 represents, in pattern mode, how a typical emission changes throughout the useful life of the exhaust gas purification catalyst according to the related art. As described, with reference to FIG. 1, at the beginning of the present specification, regarding the related art exhaust gas purifying catalyst, its initial purification ability is set to a high level in forecast of the degradation of the catalyst with use so as not to exceed a predetermined upper value (depicted by a two-dot chain line in FIG. 7) even if the catalyst degrades with use (the content of the specific component in the exhaust gas increases). For confirming whether thus designed catalyst can maintain the desired purification ability throughout the useful life, as described above, it was inevitable to repeat processes each of which requires significant man-hour and which includes performing different durability tests (including acceleration tests), assessing the content percentage of the specific component in the exhaust gas (emission) from the combustion chamber of the internal combustion engine in which is used the catalyst after the durability tests and other items, and reviewing the design specifications of the catalyst.

On the other hand, the control device of the internal combustion engine according to an embodiment of the present aspect sets the target solid solubility to get smaller as the use duration of the catalyst gets longer, as represented by one-dot chain line in FIG. 7. And, the control device concerned controls the solid solubility of the active element in the catalyst to approach thus set target solid solubility. As a result, in the exhaust gas purification device under the control of the control device concerned, the amount of the active element that is deposited from the carrier increases as the use duration of the catalyst gets longer, thereby increasing the purification ability. Thus, as represented by the solid lines and the shaded area shown in FIG. 7, the exhaust gas purification device under the control of the control device concerned is configured to function its initial purification ability at a required and sufficient level, which makes it possible to increase or maintain the purification ability of the catalyst with use of the catalyst, thereby securing the desired purification ability throughout the useful life.

Incidentally, as described above, the second threshold value is the upper limit value of the permissible range between the solid solubility of the active element in the catalyst and the target solid solubility, while the first threshold value is the lower limit value of the permissible range between the solid solubility of the active element in the catalyst and the target solid solubility. Thus, if the deviation between the solid solubility of the active element in the catalyst and the target solid solubility, at the time when the performance of the fuel supply stop control is requested to initiate, is not less than the first threshold value and is less than the second threshold value, it is possible to determine that the deviation concerned falls within the permissible range. However, strictly speaking, that the deviation concerned is within the permissible range can be established when the solid solubility is higher than the target solid solubility or vice versa. As described above, the deviation between the solid solubility and the target solid solubility at any time instant can be calculated by subtracting the target solid solubility from the solid solubility. If the solid solubility is equal to or more than the target solid solubility, the deviation is of a positive value, while if the solid solubility is less than the target solid solubility, the deviation is of a negative value.

As a consequence, in order to perform strictly the control for maintaining the solid solubility of the active element in the catalyst to be in the vicinity of the target solid solubility, even in a case where the deviation is equal to or more than the predetermined first threshold value and is less than the predetermined second threshold value (the deviation being within the permissible range), it is desirable to adjust the duration under which the stoichiometric control (in which the exhaust gas air-fuel ratio, which is an air-fuel ratio applied to the exhaust gas entering the catalyst, comes to be a theoretical air-fuel ratio) is performed prior to the initiation of the fuel supply stop control, depending on whether the deviation concerned is equal to or more than o (zero) or less than o (zero).

That is to say, the fourth aspect of the present invention is to characterize the control device of the internal combustion engine according to the third aspect of the present invention by enabling to perform the air-fuel ratio control, during a third predetermined period prior to an initiation of the fuel supply stop control, in order that the exhaust gas air-fuel ratio comes to be a theoretical air-fuel ratio, in cases where when the fuel supply stop control is requested the deviation is equal to or more than a predetermined second threshold value that is more than the predetermined first threshold value, the temperature of the catalyst is equal to or more than the second solid solution temperature, and the deviation is equal to or more than 0 (zero), and to perform the air-fuel ratio control, during a fourth predetermined period that is set to be shorter than the third predetermined period prior to the initiation of the fuel supply stop control, in order that the exhaust gas air-fuel ratio comes to be a theoretical air-fuel ratio.

As described above, the control device of the internal combustion engine according to the present embodiment performs the air-fuel ratio control, during a third predetermined period prior to an initiation of the fuel supply stop control, in order that the exhaust gas air-fuel ratio comes to be a theoretical air-fuel ratio, in a case where when the fuel supply stop control is requested to perform, the deviation is equal to or more than a predetermined second threshold value that is more than the predetermined first threshold value, the temperature of the catalyst is equal to or more than the second solid solution temperature and the deviation is equal to or more than 0 (zero). The control device of the internal combustion engine performs the air-fuel ratio control, during a predetermined fourth duration that is set to be shorter than the predetermined third duration prior to the initiation of the fuel supply stop control, in order that the exhaust gas air-fuel ratio comes to be a theoretical air-fuel ratio, in a case where the deviation is less than 0 (zero).

Thereby, according to the control device of the internal combustion engine of the present aspect, upon request of an imitation of the fuel supply stop control to perform, even if the deviation between the solid solubility of the in-catalyst active element and the target solid solubility falls within the permissible range (i.e., is equal to or more than the first threshold value and is less than the second threshold value), depending on whether the deviation is equal to or more than 0 (zero) or is less than 0 (zero), it is possible to perform more strictly the control that maintains the solid solubility of the in-catalyst active element in the vicinity of the target solid solubility by adjusting the length of the duration during which the stoichiometric control (the control for setting the air-fuel ratio of the exhaust gas entering the catalyst to be same with the theoretical air-fuel ratio) before the fuel supply stop control is initiated to perform.

It is to be noted that the third duration can be defined as, for example, a value corresponding to a length of a duration that requires for the catalyst temperature to drop to less than the second solid solution temperature if the fuel supply is continued while controlling the exhaust gas-fuel ratio to be stoichiometric. In this case, the concrete value of the duration (the length of duration) may be, for example, set to get larger and larger (longer and longer) as the catalyst temperature gets higher upon request of an imitation of the fuel supply stop control to perform, similar to how the second duration is set that is described with reference to FIG. 6. In brief, the third duration may be same with or different from the second duration, In addition, as described above, the fourth duration is set to be less than the third duration. Further, the fourth duration, similar to the third duration, can be defined as, for example, a value corresponding to a length of a duration that requires for the catalyst temperature to drop to less than the second solid solution temperature if the fuel supply is continued while controlling the exhaust gas-fuel ratio to be stoichiometric. In this case, the concrete value of the fourth duration (the length of duration), similar to the third duration, may be, for example, set to get larger and larger (longer and longer) as the catalyst temperature gets higher upon request of an imitation of the fuel supply stop control to perform.

From the above descriptions, the control device of the internal combustion engine according to the present aspect, is capable of performing more strictly the control that maintains the solid solubility of the in-catalyst active element in the vicinity of the target solid solubility throughout the useful life while suppressing, for example, deteriorations of the fuel efficiency and the emission to minimum. In other words, the control device of the internal combustion engine according to the present aspect makes it possible to establish, at a higher level, both suppressing the deterioration of the purification ability by maintaining the solid solubility of the in-catalyst active element in the vicinity of the target solid solubility and improving the fuel efficiency and emission by performing the fuel supply stop control.

Incidentally, in general, unless there are special circumstances, the air-fuel ratio of the fuel-air mixture fed to the combustion chamber in the internal combustion engine is controlled to be the same with the theoretical air-fuel ratio. However, for example, for the prevention of deterioration of the purification ability of the catalyst caused due to the overheat thereof caused by, for example, the high temperature exhaust gas, sometimes, a process may be performed in which the supply amount of the fuel is increased, the resulting vaporization heat of the fuel lowers the temperature of the exhaust gas, and the catalyst is cooled down. In such a case, the increase of the fuel supply amount is referred to as OT (Over-Temperature Protection) fuel increment. It is to be noted that hereinafter the process for increasing the fuel supply amount, for whatever purposes including others, will be collectively called "amount increment process" for allowing to use this phrase when performing the process for increasing the fuel supply amount is made for other purposes.

While the aforementioned amount increase process is being performed, it is assumed that, for example, when the fuel supply stop control is requested to perform, the solid solubility of the active element in the catalyst is extremely high (the deviation between the solid solubility and the target solid solubility is not less than the second threshold value) and the catalyst temperature is above the temperature which allows the active element to proceed the formation of the solid solution in the carrier (the catalyst temperature is not less than the second solid solution temperature). In such a case, as described above with respect to the various aspects, during the specific duration prior to the ignition of the fuel supply stop control to perform, if the stoichiometric control (the control for adjusting the exhaust gas-fuel ratio, which is the air-fuel ratio of the exhaust gas entering the catalyst) is performed, the solid solubility of the active element is prevented from being further increased, but the performance of the amount increment process is interrupted, with the result that the desired effect (for example, effect of the prevention of the catalyst overheat) caused by the amount increment process (for example, the OT fuel increment) may not be attained satisfactory.

On the other hand, while the aforementioned amount increase process is being performed as described above, in a case where when the fuel supply stop control is requested to perform, the solid solubility of the active element in the catalyst at this time instant is extremely high and the catalyst temperature is above the temperature which allows the active element to proceed the formation of the solid solution component in the carrier, instead of performing the stoichiometric control during the specific duration that is prior to the initiation of the fuel supply stop control, the amount increment process is performed, the stoichiometric control is subsequently performed during the specific duration that is prior to the initiation of the fuel supply stop control, and thereafter the performance of the fuel supply stop control is performed, resulting in that the desired effect caused by the amount increment process may be attained satisfactory without having to interrupt the amount increment process.

In addition, during performance of the amount increment process, the exhaust gas-fuel ratio is made to be rich, which makes it possible to attain a promotion of the deposition of the active element in the catalyst in addition to the restriction of a further increase of the solid solubility of the active element in the catalyst, thereby causing the extremely increased solid solubility to lower. Furthermore, the purpose of the amount increment process being performed during this duration is not newly introduced to lower the solid solubility of the active element in the catalyst, but is to, for example, the prevention of the catalyst as a part of the usual engine control. Thus, unlike the positive intervention in the air-fuel ratio control as described at the beginning of the specification, problems such as deteriorations of the fuel efficiency and emission that come from the solid solution control will not be invited.

It is to be noted that the purpose of the amount increment process being performed during this duration is to, for example, the prevention of the catalyst as a part of the usual engine control and is not newly introduced to lower the solid solubility of the active element in the catalyst. Thus, it is assumed to a state in which at the termination of the amount incremental process, the solid solubility of the active element in the catalyst is not lowered in sufficient and therefore still remains at the extremely high level. In addition, it is general that, for example, the target temperature that is set when the catalyst is cooled down by the amount incremental process in order to prevent the overheat of the catalyst, is higher than the temperature as the threshold (the second solid solution temperature) that is set in a case of restricting the active element in the catalyst to form a solid solution component in the carrier. Thus, it is possible to assume that the catalyst temperature is equal to or more than the second solid solution temperature at a time instant when the amount incremental process is terminated.

From the above, even when the fuel supply stop control is initiated to perform after completion of the amount increment procedure as described above, as described in the descriptions of the various aspects, it is desirable to provide the duration for allowing the air-fuel ratio control to perform in order that the exhaust gas-fuel ratio comes to be the theoretical air-fuel ratio.

On the other hand, as described above, unless otherwise circumstances, it is a general control manner for adjusting the air-fuel ratio of the air-fuel mixture that is to be supplied to the combustion chamber in the internal combustion engine to be the theoretical air-fuel ratio. During such a control (hereinafter, which is, sometimes, referred to as "FB control"), it is assumed that, for example, when the fuel supply stop control is requested to perform, the solid solubility of the active element in the catalyst at this time instant is extremely high (the deviation between the solid solubility and the target solid solubility is not less than the second threshold value) and the catalyst temperature is above the temperature which allows the active element to proceed the formation of the solid solution in the carrier (the catalyst temperature is not less than the second solid solution temperature). Under such circumstances, if the performance of the fuel supply stop control is initiated, the exhaust gas-fuel ratio caused to be rich, which increases further the solid solubility of the active element in the catalyst (that has already been at the high level). Thus, under such circumstances, it is desired to lower the solid solubility in advance in forecast of the possible increase of the solid solubility caused by the fuel supply stop control, by suspending the performance of the fuel supply stop control and subsequently executing the amount increment procedure.

Thus, in a case where during performance of the FB control, when the fuel supply stop control is requested to perform, the solid solubility of the active element in the catalyst at this time instant is extremely high and the catalyst temperature is above the temperature which allows the active element to proceed the formation of the solid solution component in the carrier, after suspending the performance of the fuel supply stop control and subsequently executing the amount increment procedure, lowering the solid solubility in forecast of the possible increase of the solid solubility caused by the fuel supply stop control will result in the restriction of further increase of the solid solubility of the active element in the catalyst (that has already been at the high level). Thereafter, the control devices of the internal combustion engine according to the various aspects repeats the solid solution control at a given cycle, the solid solution control is performed, as described above, depending on every time solid solubility of the active element in the catalyst and the catalyst temperature, thereby establishing, at a higher level, both suppressing the deterioration of the purification ability by maintaining the solid solubility of the in-catalyst active element in the vicinity of the target solid solubility and improving the fuel efficiency and emission by performing the fuel supply stop control.

As described above, in one of the preferred aspects of the present invention, in a case where when the fuel supply stop control is requested to perform, the deviation between the solid solubility of the active element in the catalyst at the time of this time instant and the target solid solubility is not less than the second threshold value and the catalyst temperature is not less than the second solid solution temperature, if the amount increment procedure has been performed (during a predetermined duration) immediately before this time instant, after the amount increment procedure completes, the stoichiometric control (the control for adjusting controlling the exhaust gas-fuel ratio that is the air-fuel ratio of the exhaust gas entering the catalyst to be same with the theoretical air-fuel ratio) for a duration between the completion of the amount increment procedure and the initiation of the performance of the fuel supply stop control, and thereafter the performance of the fuel supply stop control is initiated. Thereby, without having to arise new problems causes by the solid solution control that include, for example, deteriorations of the fuel efficiency and emission and to reduce the desired effects derived from the amount increment procedure, it is possible to lower the solid solubility that has already been at a highly increased level.

On the other hand, in a case where when the fuel supply stop control is requested to perform, the deviation between the solid solubility of the active element in the catalyst at the time of this time instant and the target solid solubility is not less than the second threshold value and the catalyst temperature is not less than the second solid solution temperature, if the FB control has been performed (during a predetermined duration) immediately before this time instant, it is possible to suspend the performance of the fuel supply stop control, to perform the amount increment procedure in which the solid solubility is lowered in advance in forecast of the possible increase of the solid solubility, and to restrict a further increase of the solid solubility of the active element in the catalyst (that has been at an extremely high level), even the solid solution control is performed after the amount increment procedure together with the fuel supply stop control. As a result, it is possible to establish, at a higher level, both suppressing the deterioration of the purification ability by maintaining the solid solubility of the in-catalyst active element in the vicinity of the target solid solubility and improving the fuel efficiency and emission by performing the fuel supply stop control.

That is to say, the fifth aspect of the present invention is to further characterize the control device of the internal combustion engine according to any one of the first through fourth aspects of the present invention in that under a condition under which when the fuel supply stop control is requested to perform, the deviation is equal to or more than the second threshold value and the temperature of the catalyst is equal to or more than the second solid solution temperature, the control unit is configured to perform, in a case where an amount incremental procedure has been performed for allowing the air-fuel ratio control to adjust an exhaust gas air-fuel ratio of a mixture supplied to the combustion engine to be a theoretical air-fuel ratio, after completion of the amount incremental procedure, the fuel-air ratio control, during a fifth predetermined period prior to the initiation of the fuel supply stop control, in order that the exhaust gas air-fuel ratio comes to be the theoretical air-fuel ratio, and/or the control unit is to perform a fuel supply increase control, when the air-fuel control has been performed during a predetermined period immediately before the fuel supply stop control is requested to perform, in order to decrease the air-fuel mixture to a value less than the theoretical air-fuel ratio by increasing the fuel supplied to the combustion chamber for suspending the fuel supply stop control.

As described above, the control device of the internal combustion engine according to the present aspect performs either or both of (CONTROL-A and CONTROL-B) which will be detailed below in a case where when the performance of the fuel supply stop control is requested, the deviation is not less than the second threshold value and the catalyst temperature is not less than the second solid solution temperature. That is to say, the control device of the internal combustion engine according to the present aspect may be configured to perform the CONTROL-A upon establishment of conditions defined therein, while the control device of the internal combustion engine according to the present aspect may be configured to perform the CONTROL-B upon establishment of conditions defined therein. Otherwise, the control device of the internal combustion engine according to the present aspect may be configured to perform both the CONTROL-A upon establishment of conditions defined therein and CONTROL-B upon establishment of conditions defined therein.

At first, the CONTROL-A operates as follows: In a case where the amount increment procedure is performed by which the air-fuel ratio control is caused to adjust the air-fuel ratio of the air-fuel mixture to be fed to the combustion chamber to exceed the theoretical air-fuel ratio during a duration that is immediately before the request of the performance of the fuel supply stop control, after completion of the amount increment procedure, the CONTROL-A causes the air-fuel ratio control to adjust the exhaust gas-fuel ratio to be same with the theoretical air-fuel ratio during a fifth duration that is immediately before the request of the performance of the fuel supply stop control. Here, the concrete value of the duration that is immediately before the request of the performance of the fuel supply stop control can be determined properly as a suitable length, for example, the length being required for determining the formats of the control and procedure under performance based on various obtained detection and control signals used for the internal combustion engine concerned.

In addition, the fifth duration can be defined as, for example, a length of duration that is required for the catalyst temperature drops down less than the second solid solution temperature in a case where the fuel supply to the internal combustion engine is continued while the exhaust gas-fuel ratio is controlled to be the theoretical air-fuel ratio. In this case, the concrete value (the length of duration) of the fifth duration, similar to the explanation of the first duration that is made with reference to the solid line in the graph of FIG. 6, may be set to get larger and larger (longer and longer) as the catalyst temperature gets higher at the time instant when the performance of the fuel supply stop control is requested. In addition, the fifth duration may be same with or different from the first duration. Thereby, the control device of the internal combustion engine according to the present aspect makes it possible to lower the solid solubility that has already been at a highly increased level, without having to arise new problems causes by the solid solution control that include, for example, deteriorations of the fuel efficiency and emission and to reduce the desired effects derived from the amount increment procedure.

Next, in a case where the air-fuel ratio control is caused to adjust the air-fuel ratio of the air-fuel mixture to be fed to the combustion chamber to be same with the theoretical air-fuel ratio during the duration that is immediately before the request of the performance of the fuel supply stop control, the CONTROL-B performs the fuel supply increment control to adjust the air-fuel ratio of the air-fuel mixture to be fed to the combustion chamber to be less than the theoretical air-fuel ratio by increasing the amount of the fuel to be supplied to the combustion chamber and suspend the performance of the fuel supply stop control. Here, the concrete value of the duration that is immediately before the request of the performance of the fuel supply stop control can be determined properly as a suitable length, for example, the length being required for determining the formats of the control and procedure under performance based on various obtained detection and control signals used for the internal combustion engine concerned.

Thus, the control device of the internal combustion engine makes it possible to lower the solid solubility in advance in forecast of the possible increase of the solid solubility caused by the performance of the fuel supply stop control. As a result, it is possible to restrict a further increase of the solid solubility of the active element in the catalyst (that has already been at the high level). Thereafter, the control devices of the internal combustion engine according to the various aspects repeats the solid solution control at a given cycle, the solid solution control is performed, as described above, depending on every time solid solubility of the active element in the catalyst and the catalyst temperature, thereby establishing, at a higher level, both suppressing the deterioration of the purification ability by maintaining the solid solubility of the in-catalyst active element in the vicinity of the target solid solubility and improving the fuel efficiency and emission by performing the fuel supply stop control.

Incidentally, in the description of the control performed by each of the control devices of the internal combustion engine according to the various aspects, it is explained that the control switches various procedures based on the deviation between the solid solubility of the in-catalyst active element in the carrier and the target solid solubility. However, the various controls which are performed by the control device according to each of the various aspects of the present invention for use in the internal combustion engine are, actually, performed generally by a central processing unit (CPU) provided in the control device concerned according to the algorithm that is described in the form of a computer program that is stored in data storage devices (including, for example, ROM, RAM, and HDD) provided in the control device. In such a design, for example, switching the various procedures may be performed as follows: preparing one or more flags required for switching the various procedures, setting a value of the flag by a routine that corresponds to the deviation between the solid solubility of the in-catalyst active element in the carrier and the target solid solubility (the routine being sometimes referred to as "flag setting routine"), the routine being performed every time a specific duration elapses, and switching the various procedures based on the resulting value of the flag.

Figure 8:
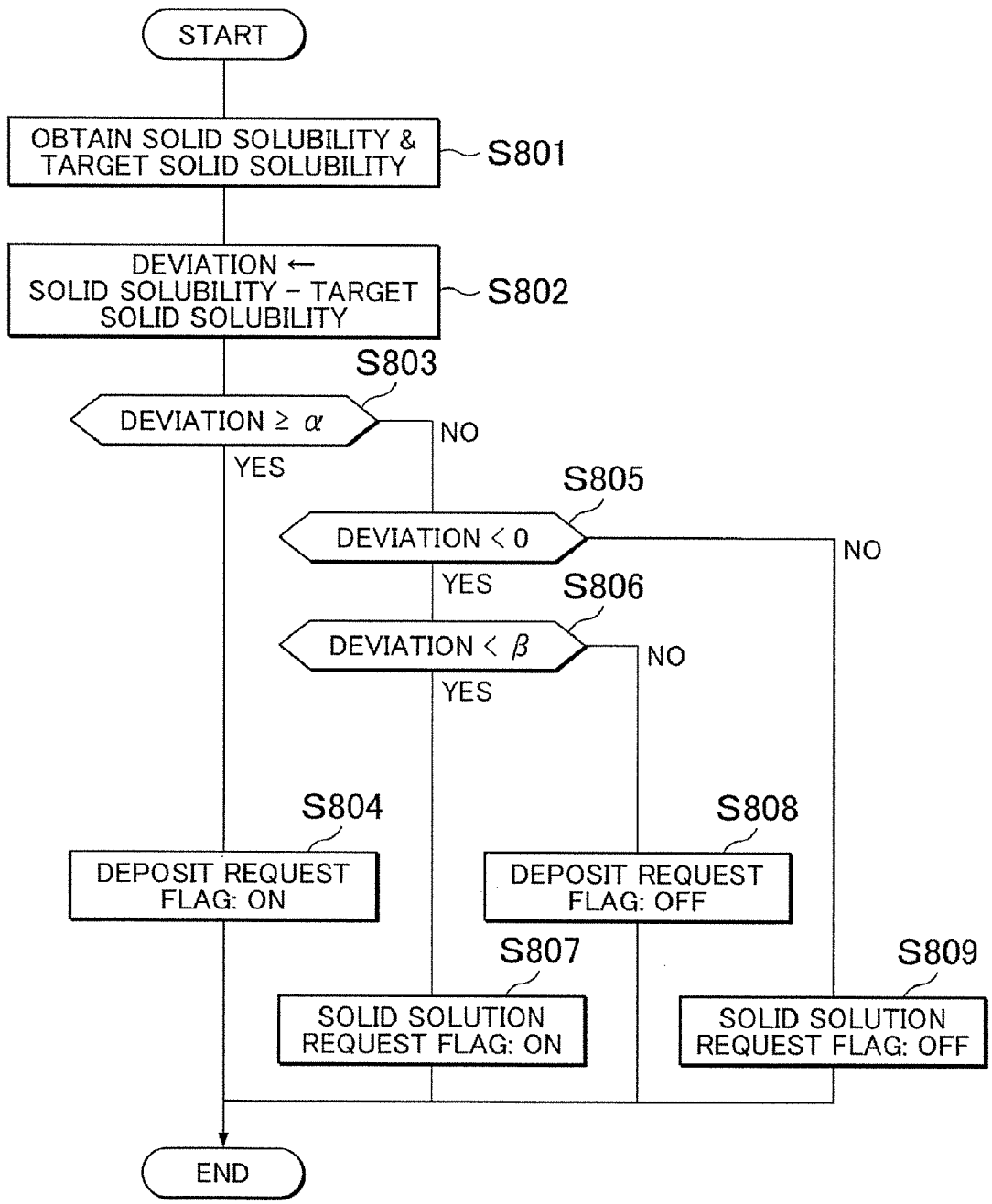
FIG. 8 is a flowchart that represents a flow of a flag setting routine that is executed in a control device of the an internal combustion engine according to an aspect of the present invention.

Hereinbelow, the aforementioned flag setting routine will be described in detail with reference to the attached drawing. As describe above, FIG. 8 is a flowchart that represents a flow of a flag setting routine that is executed in a control device of the an internal combustion engine according to an aspect of the present invention. As shown in FIG. 8, first of all, at Step S801, the solid solubility of the in-catalyst active element in the carrier at a specific time instant and the target solid solubility are obtained. The solid solution concerned may be obtained based on the transition records up to the specific time instant regarding the catalyst temperature and the exhaust gas-fuel ratio related to the catalyst, as described above with reference to the flowchart in FIG. 3. In addition, the target solid solubility concerned may be, as described above, set to get smaller as the use duration of the catalyst concerned gets longer in order that the catalyst concerned can develop its desired function throughout its useful life.

Next, at Step S802, a calculation is made for finding the deviation between the solid solubility at the specific time instant and the target solid solubility. The deviation concerned can be obtained, for example, by subtracting the target solid solubility from the solid solubility obtained at Step S801. In this method, if the solid solubility is larger than the target solid solubility, the deviation concerned is of a positive value, while if the solid solubility is smaller than the target solid solubility, the deviation concerned is of a negative value.

Next, at Step S803, it is determined whether the deviation calculated at Step S802 is equal to or more than the second threshold value ($\alpha$). If the deviation concerned is judged to be equal to or more than the second threshold value ($\alpha$) (Step S803: Yes), this means that the solid solubility of the in-catalyst active element in the carrier is extremely high. That is to say, in such a case, it is required to deposit the active element from the carrier for lowering the solid solubility and therefore the next Step S804 is executed to set a deposition request flag (set to be ON).

On the other hand, if the deviation calculated at Step S802 is judged to be less than the second threshold value ($\alpha$) (Step S803: No), the control proceeds to Step 805 to determine whether the latest deviation is of a negative value or not. At Step S805, if the latest deviation is found to be of a negative value (Step S805: Yes), this means that the solid solubility of the in-catalyst active element in the carrier is lower than the target solid solubility. In such a case, the control proceeds to the next the next Step S806 to determine whether or not the deviation is less than the first threshold value ($\beta$). At Step S806, if the deviation is found to be less than the first threshold value ($\beta$) (Step S806: Yes), this means that the solid solubility of the in-catalyst active element in the carrier is extremely low. That is to say, in such a case, it is required to cause the in-catalyst active element to increase the solid solubility in the carrier for increasing the solid solubility, by which a solid solution request flag is set (set to be ON).

On the other hand, at Step S806, if the deviation is judged not to be less than the first threshold value ($\beta$) (Step S806: No), this means that the solid solubility of the in-catalyst active element, though it is lower than the target solid solubility, falls within the permissible range. In brief, in such a case, it is not requested to lower the solid solubility by depositing the active element from the carrier and therefore at the next Step S808 the deposit request flag is cleared (set to be OFF).

Incidentally, if the deviation is found not to be of a negative value at Step S805 (Step S805: No), this means that the solid solubility of the in-catalyst active element in the carrier is more than the target solid solubility. That is to say, in such a case, it is not required to increase the solid solubility to increase the solid solubility of the active element in the carrier and therefore at the next Step S809 the solid solution request flag is cleared (set to be OFF).

As described above, if the deviation between the solid solubility and the target solid solubility is equal to or more than the second threshold value ($\alpha$), the deposit request flag is set (set to be ON), if the deviation between the solid solubility and the target solid solubility is less than the first threshold value ($\beta$), the solid solution request flag is set (set to be ON); if the deviation between the solid solubility and the target solid solubility is not less than the first threshold value ($\beta$) and concurrently is if of a negative value, the deposit request flag is cleared (set to be OFF); and if the deviation between the solid solubility and the target solid solubility is not less than the first threshold value ($\beta$) and concurrently is of a positive value, the solid solution request flag is cleared (set to be OFF). Thus, every time the predetermined duration elapses, the solid solution request flag and the deposit request flag are updated in response to the value of the deviation between the solid solubility of the active element in the carrier and the target solid solubility. In other words, the states of the respective solid solution request flag and the deposit request flag correspond to the deviation between the solid solubility of the active element in the carrier and the target solid solubility, by which it may be possible to switch the various procedures in the control device of the internal combustion engine according to the present invention.

Hereinbelow, explanations will be made regarding, for example, the various aspects of the present invention. It is to be noted that the following explanations are exemplary only and therefore shall not be interpreted to limit the scope of the present invention.

Regarding an embodiment of the control device of the internal combustion engine according to one aspect of the present invention, an explanation will be made in detail with reference to the attached drawing that describes how the solid solution control is performed in the control device of the internal combustion engine according to one aspect of the present invention. As described above, FIG. 9 is a flowchart that represents a flow of various kinds of processing in the solid soluble control which is executed in the control device of the internal combustion engine according to the aspect of the present. The exemplified solid solution control in the present embodiment shall be performed using the solid request flag and the deposit request flag which are used in the aforementioned description of the solid solution control by which FIG. 8 is referenced.

Figure 9:
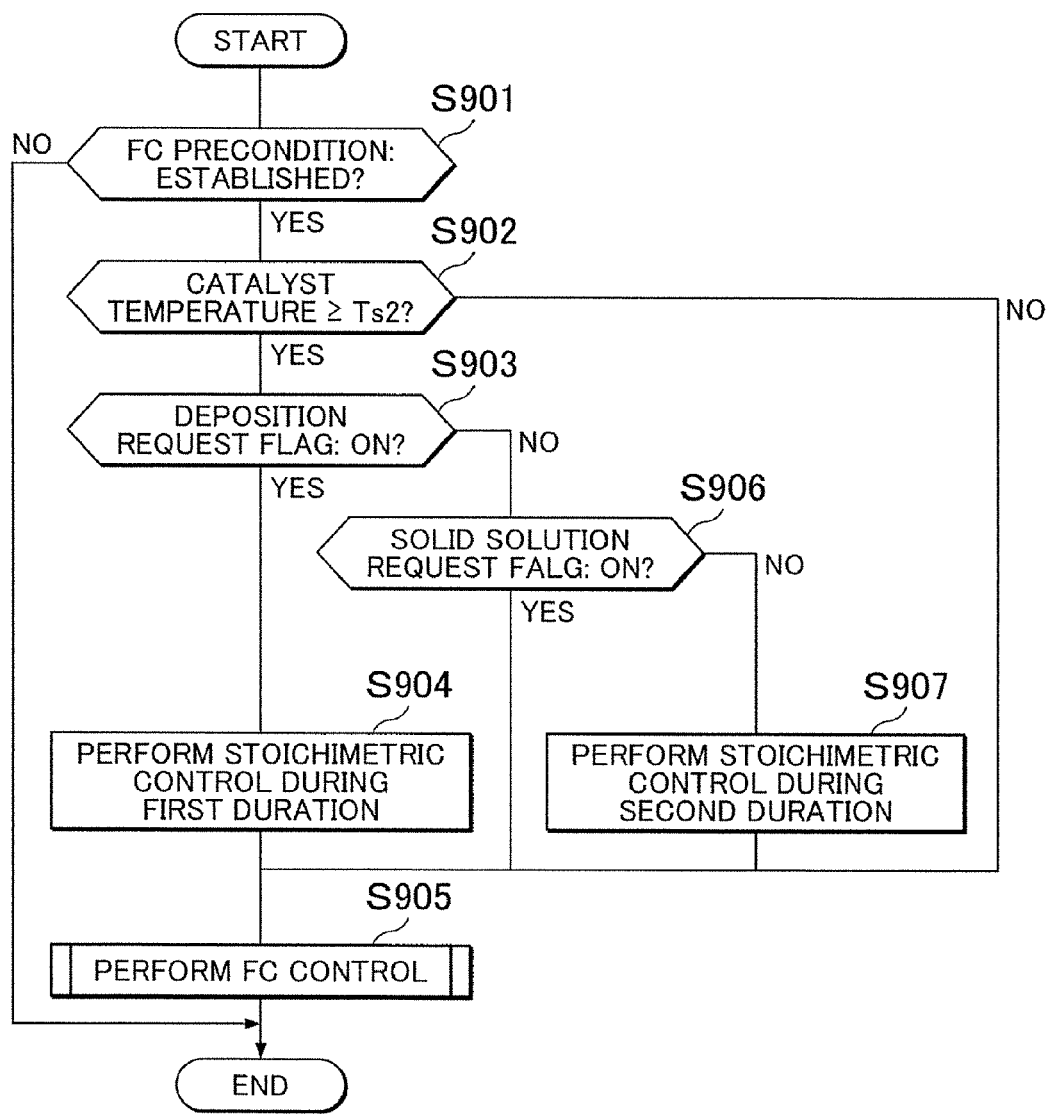
FIG. 9 is a flowchart that represents a flow of various kinds of processing in a solid soluble control which is executed in a control device of the an internal combustion engine according to the aspect of the present invention.

As shown in FIG. 9, first of all, at Step S901, it is determined whether or not a condition is established that request for a performance of the fuel supply stop control (hereinafter, such a condition is referred to as "FC precondition") in the control of the internal combustion engine concerned. In Step S901, if the FC precondition is judged not to be established (Step S901: No), the routine is terminated without performing a specific process. On the other hand, at Step S901, if the FC precondition is judged to be established (Step S901: Yes), at the next Step S902, it is determined whether or not the catalyst temperature is equal to or more than the second solid solution temperature (Ts2).

At Step S902, if the catalyst temperature is judged not to be equal to or more than the second solid solution temperature (Ts2) (Step S902: No), under which there is little possibility of increasing the solid solubility even if the exhaust gas-fuel ratio is brought into lean by the fuel supply stop control (FC control), the control proceeds, without performing a specific process, to Step S905 for immediately performing the FC control, and thereafter the routine is terminated. On the other hand, at Step S902, if the catalyst temperature is judged to be equal to or more than the second solid solution temperature (Ts2) (Step S902: Yes), under which there is high possibility of increasing the solid solubility due to the fact that the exhaust gas-fuel ratio is brought into lean by the fuel supply stop control (FC control), at Step S903, it is determined whether or not the deposit request flag is ON (i.e., whether or not the solid solubility of the in-catalyst active element in the carrier is extremely high).

At Step S903, if the deposit request flag is judged to be ON (Step S903: Yes), this means that the solid solubility has already been extremely high. Thus, in such a case, for the restriction of further increase of the solid solubility caused which results from the exhaust gas-fuel ratio being lean by the FC control, at the next Step S904, the air-fuel ratio control is performed in order to adjust the exhaust gas-fuel ratio to be the theoretical air-fuel ratio during the predetermined first duration (D1) prior to the initiation of the performance of the FC control. Thereafter, at Step S905, the FC control is performed and the routine is terminated. In such way, it is possible to lower the catalyst temperature at the time when the performance of the FC control is initiated, which makes it possible to restrict the degradation of the purification ability of the catalyst caused by the extreme increase of the solid solubility of the in-catalyst active element in the carrier. On the other hand, if the deposit request flag is judged to be OFF (i.e., the solid solubility of the in-catalyst active element in the carrier is not extremely high) (Step S903: No), at the next Step S906, it is determined whether or not the deposit request flag is ON or not (i.e., whether or not the solid solubility of the in-catalyst active element in the carrier is extremely low)

At Step S906, if the solid solution request flag is judged to be ON (Step S906: Yes), under which the solid solubility is extremely low, it is desirable to increase the solid solubility by causing the exhaust gas-fuel ratio to be lean. Thus, in such a case, the control proceeds to, without performing a procedure, to the next Step 905 for performing immediately the FC control, and the routine is terminated. On the other hand, at Step S906, if the solid solution request flag is judged to be OFF (Step S906: No), this means that the solid solubility falls within the permissible range. In other words, such a state of the solid solubility is not so extremely high and therefore no problem will arise even if the solid solubility is allowed to increase to some extent which results from that the exhaust gas-fuel ratio comes to be lean by the FC control. However, the immediate initiation of the performance of the FC control may increase the solid solubility, thereby deviating largely from the target solid solubility. Thus, in such a case, at the next Step S907, the air-fuel ratio control is performed is performed in order to adjust the exhaust gas-fuel ratio to be the theoretical air-fuel ratio during the predetermined second duration (D2), which is set to be shorter than the first duration (D1), prior to the initiation of the performance of the FC control. Thereafter, at Step S905, the FC control is performed, and the routine is terminated. Thereby, it is possible to establish, at a higher level, both suppressing the deterioration of the purification ability by restricting the increase of the solid solubility of the in-catalyst active element and improving the fuel efficiency and emission by performing the FC control.

Regarding another embodiment of the control device of the internal combustion engine according to one aspect of the present invention, an explanation will be made in detail with reference to the attached drawing that describes how the solid solution control is performed in the control device of the internal combustion engine according to one aspect of the present invention. As described above, FIG. 10 is a flowchart that represents a flow of various kinds of processing in the solid soluble control which is executed in the control device of the internal combustion engine according to the aspect of the present. The exemplified solid solution control in the present embodiment shall be performed using the solid request flag and the deposit request flag which are used in the aforementioned description of the solid solution control by which FIG. 8 is referenced.

Figure 10:
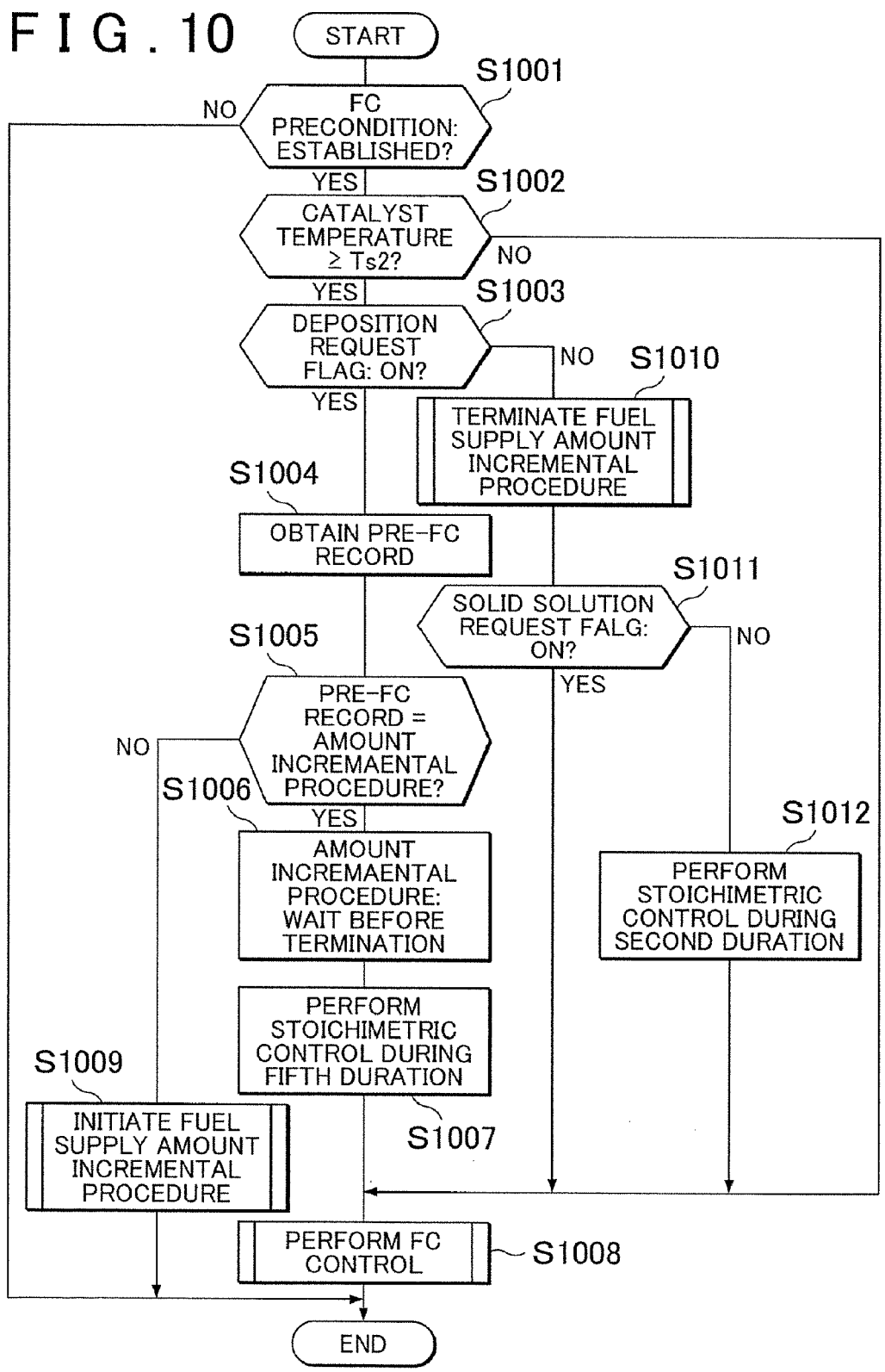
FIG. 10 is a flowchart that represents a flow of various kinds of processing in a solid soluble control which is executed in a control device of the an internal combustion engine according to another aspect of the present invention.

As shown in FIG. 10, first of all, at Step S1001, it is determined whether or not a condition is established that request for a performance of the fuel supply stop control in the control of the internal combustion engine concerned. In Step S1001, if the FC precondition is judged not to be established (Step S1001: No), the routine is terminated without performing a specific process. On the other hand, at Step S1001, if the FC precondition is judged to be established (Step S1001: Yes), at the next Step S1002, it is determined whether or not the catalyst temperature is equal to or more than the second solid solution temperature (Ts2).

At Step S1002, if the catalyst temperature is judged not to be equal to or more than the second solid solution temperature (Ts2) (Step S1002: No), under which there is little possibility of increasing the solid solubility even if the exhaust gas-fuel ratio is brought into lean by the FC control, the control proceeds, without performing a specific process, to Step S1008 for immediately performing the FC control, and thereafter the routine is terminated. On the other hand, at Step S1002, if the catalyst temperature is judged to be equal to or more than the second solid solution temperature (Ts2) (Step S1002: Yes), under which there is high possibility of increasing the solid solubility due to the fact that the exhaust gas-fuel ratio is brought into lean by the FC control, at Step S1003, it is determined whether or not the deposit request flag is ON (i.e., whether or not the solid solubility of the in-catalyst active element in the carrier is extremely high).

At Step S1003, if the deposit request flag is judged to be ON (Step S1003: Yes), this means that the solid solubility has already been extremely high. Thus, in such a case, similar to the aforementioned embodiment, for the restriction of further increase of the solid solubility caused which results from the exhaust gas-fuel ratio being lean by the FC control, it is desired to perform the air-fuel ratio control in order to adjust the exhaust gas-fuel ratio to be the theoretical air-fuel ratio during a predetermined duration prior to the initiation of the performance of the FC control.

However, as described above, unless otherwise circumstances, it is general to perform the FB control, under which for example the amount incremental procedure (for increasing the amount of fuel to be supplied to the combustion chamber) is sometimes performed in accordance with a situation. In a case where situations are concurrently satisfied, during the aforementioned amount incremental procedure is being performed, which include the FC precondition being established, the catalyst temperature being not less than the second solid solution temperature (Ts2), and the deposit request flag being ON (i.e., the solid solubility is extremely high), if the air-fuel ratio control is performed immediately in order to adjust the exhaust gas-fuel ratio to be the theoretical air-fuel ratio during a predetermined duration prior to the initiation of the performance of the FC control, the amount incremental procedure is interrupted, which results in missing a chance to lower the solid solubility that has already been at the extremely high level without having to arise problems of deteriorations of the fuel efficiency and emission associated with the solid solution control, in addition to insufficient enjoy of the desired effects by the amount incremental procedure.

In light of the above, in the present embodiment, at Step S1004, a historical record of the air-fuel ratio control during a predetermined duration that is immediately before the FC precondition is established (hereinafter, such a record is sometimes referred to as "pre-FC record") is obtained (from, for example, a data set stored in the data storage device provided in the control device of the internal combustion engine). Then, at the next Step S1005, it is determined whether the pre-FC record indicates the aforementioned "amount incremental procedure" or not.

At the next Step S1005, if the pre-FC record is judged to indicate the aforementioned amount incremental procedure (Step S1005: Yes), after waiting the completion of the incremental procedure at Step S1006, at the next Step S1007, the air-fuel ratio control is performed in order to adjust the exhaust gas-fuel ratio to be the theoretical air-fuel ratio during the fifth duration prior to the initiation of the performance of the FC control. Thereafter, at Step 1008, the FC control is performed and the routine is terminated. Thereby, it is possible to lower the solid solubility that has already been at the extremely high level without having to cause problems of deteriorations of the fuel efficiency and emission associated with the solid solution control.

On the other hand, as described above, unless otherwise circumstances, it is general to perform the FB control. In a case where situations are concurrently satisfied, during the aforementioned amount incremental procedure is being performed, which include the FC precondition being established, the catalyst temperature being not less than the second solid solution temperature (Ts2), and the deposit request flag being ON (i.e., the solid solubility is extremely high), if the FC control is performed, as described above, the exhaust gas-fuel ratio comes to be lean, thereby further increasing the solid solubility (that has already been at the extremely high level) of the in-catalyst active element. In such a case, as described above, it is desirable to lower the solid solubility in forecast of the increase of the solid solubility associated with the performance of the fuel supply stop control, by suspending the performance of the fuel supply stop control and subsequently performing the amount incremental procedure. As a result, it is possible to restrict a further increase of the solid solubility (that has already been at an extremely high level) of the in-catalyst active element.

In light of the above, in the present embodiment, at Step S1005, if the pre-FC record is judged not to indicate the aforementioned amount incremental procedure (i.e., judged to indicates the FC control) (Step S1005: No), the fuel supply amount increment procedure is performed and the routine is terminated. Thereby, it is possible to lower the solid solubility in forecast of the increase of the solid solubility associated with the performance of the fuel supply stop control, which makes it possible to restrict the further increase of the solid solubility of the in-catalyst active element. Thereafter, if the solid solution control according to the present embodiment is performed in a repeated manner at a given cycle, the resulting solid solution control is based on the currently detected solid solubility of the in-catalyst active element and catalyst temperature, which makes it possible to establish, at a higher level, both suppressing the deterioration of the purification ability by restricting the increase of the solid solubility of the in-catalyst active element and improving the fuel efficiency and emission by performing the fuel supply stop control.

On the other hand, if the deposit request flag is judged to be OFF (i.e., the solid solubility of the in-catalyst active element in the carrier is not extremely high) (Step S1003: No), this means that the solid solubility of the in-catalyst active element falls within the permissible range which requires no further decrease of the solid solubility, and at the next Step S1010, the fuel amount increment procedure control is terminated (when it is being performed). And, at the next Step S1011, it is determined whether or not the deposit request flag is ON (i.e., whether or not the solid solubility of the in-catalyst active element in the carrier is extremely high).

At Step S1011, if the solid solution request flag is judged to be ON (Step S1011: Yes), under which the solid solubility is extremely low, it is desirable to increase the solid solubility by causing the exhaust gas-fuel ratio to be lean. Thus, in such a case, the control proceeds to, without performing any procedure, to the next Step S1008 for performing immediately the FC control, and the routine is terminated.

On the other hand, at Step S1011, if the solid solution request flag is judged to be OFF (Step S1010: No), this means that the solid solubility falls within the permissible range. Thus, in the present embodiment, similar to the aforementioned embodiment, at the next Step S1012, the air-fuel ratio control is performed in order to adjust the exhaust gas-fuel ratio to be the theoretical air-fuel ratio during the predetermined second duration (D2) prior to the initiation of the performance of the FC control. Thereafter, at Step S1008, the FC control is performed. Thereby, as described above, it is possible to establish, at a higher level, both suppressing the deterioration of the purification ability by restricting the increase of the solid solubility of the in-catalyst active element and improving the fuel efficiency and emission by performing the fuel supply stop control.

The present embodiment, as described above, explains a mode in which the fuel amount supply procedure that is initiated at Step S1009 is terminated (is caused to stop) at Step S1010, if the deposit request flag is judged to be OFF at Step S1003. However, the specific method of how to terminates the fuel supply amount incremental supply is not limited to the aforementioned method, and therefore, for example, the duration during which the fuel supply amount incremental procedure is performed may be predetermined before the fuel supply amount incremental procedure is performed at Step S1009. In such case, the duration during which the fuel supply amount incremental procedure is performed may be defined, as a required duration for the performance of the fuel supply amount incremental procedure to lower the solid solubility to the target solid solubility (and otherwise no more than the upper limit value of the permissible range), based on, for example, the solid solubility and the catalyst temperature when the FC precondition is judged to be established at Step S1001 (i.e., when the fuel supply stop control is requested).

In the above, for the purpose of explaining the present invention, some aspects having a specific configurations and corresponding embodiments have been described with occasional reference to the attached drawings. However, the scope of the present invention is not interpreted as being limited to these exemplified aspects and embodiments, and therefore it will be understood that various modifications may be made within the disclosures in the claims and the specification.

What is claimed is:

1. A control device for controlling an internal combustion comprising:
    a control unit operatively connected to the internal combustion engine, the control unit configured to perform a fuel supply stop control that stops a fuel supply to a combustion chamber; and
    an exhaust gas purification device that purifies exhaust gas emitted from the combustion chamber,
    wherein the exhaust gas purification device gas includes a catalyst that has an active element and a carrier, the active element being served for activating an oxidizing reaction or a reducing reaction of a specific component contained in the exhaust gas, the carrier being served for carrying the active element,
    wherein in the catalyst the active element forms a solid solution component in the carrier if a temperature of the catalyst is equal to or more than a predetermined first solid solution temperature and an internal atmosphere of the catalyst is an oxidizing atmosphere,
    and in the catalyst the active element is deposited from the carrier if the temperature of the catalyst is equal to or more than a predetermined deposition temperature and the internal atmosphere of the catalyst is a reducing atmosphere, and
    wherein the control unit is configured to calculate a deviation between a solid solubility that represents a degree the active element forms the solid solution component in the carrier and a target solid solubility, and the control unit is configured to operate the internal combustion engine to suspend a performance of the fuel supply stop control if the deviation is equal to or more than a predetermined first threshold value and the temperature of the catalyst is equal to or more than a second solid solution temperature.

2. The control device of the internal combustion engine according to claim 1,
    wherein in a case where the control unit is requested to perform the fuel supply stop control, the deviation is equal to or more than a predetermined second threshold value that is more than the predetermined first threshold value and the temperature of the catalyst is equal to or more than the second solid solution temperature, the control unit performs an air-fuel ratio control, during a predetermined first period prior to an initiation of the fuel supply stop control, so that an exhaust gas air-fuel ratio, which is an air-fuel ratio applied to the exhaust gas entering the catalyst, comes to be a theoretical air-fuel ratio.

3. The control device of the internal combustion engine according to claim 1, wherein
    the control unit is configured to perform the air-fuel ratio control, during a predetermined first period prior to an initiation of the fuel supply stop control, so that an exhaust gas air-fuel ratio, which is an air-fuel ratio applied to the exhaust gas entering the catalyst, comes to be a theoretical air-fuel ratio, in cases where when the control unit is requested to perform the fuel supply stop control, the deviation is equal to or more than the predetermined second threshold value that is more than the predetermined first threshold value and the temperature of the catalyst is equal to or more than the second solid solution temperature,
    the control unit is configured to perform the air-fuel ratio control, during a predetermined second period that is shorter than the predetermined first period prior to an initiation of the fuel supply stop control, so that an exhaust gas air-fuel ratio, which is an air-fuel ratio applied to the exhaust gas entering the catalyst, comes to be a theoretical air-fuel ratio, in a case where the deviation is equal to or more than the predetermined first threshold value and is less than the predetermined second threshold value, and
    the control unit is configured to suspend the fuel supply stop control to perform in a case where the deviation is less than the predetermined first threshold value.

4. The control device of the internal combustion engine according to claim 3, wherein
    the control unit is configured
    to perform the air-fuel ratio control, during a third predetermined period prior to the initiation of the fuel supply stop control, so that the exhaust gas air-fuel ratio comes to be the theoretical air-fuel ratio, in a case where when the fuel supply stop control is requested to perform, the deviation is equal to or more than the predetermined first threshold value and is less than the predetermined second threshold value and the temperature of the catalyst is equal to or more than the second solid solution temperature, and the deviation is equal to or more than 0 (zero), and to perform the air-fuel ratio control, during a fourth predetermined period that is set to be shorter than the third predetermined period prior to the initiation of the fuel supply stop control, in order that the exhaust gas air-fuel ratio comes to be the theoretical air-fuel ratio, in a case where when the fuel supply stop control is requested to perform, the deviation is equal to or more than the predetermined first threshold value and is less than the predetermined second threshold value and the temperature of the catalyst is equal to or more than the second solid solution temperature, and the deviation is less than 0 (zero).

5. The control device of the internal combustion engine according to claim 2, wherein
   (i) when the fuel supply stop control is requested to perform, the deviation is equal to or more than the second threshold value and the temperature of the catalyst is equal to or more than the second solid solution temperature, and (ii) an amount incremental procedure has been performed for allowing the air-fuel ratio control to adjust an air-fuel ratio of a mixture supplied to the combustion engine to be a theoretical air-fuel ratio,
   the control unit is configured to perform,
   after completion of the amount incremental procedure, the fuel-air ratio control, during a fifth predetermined period prior to the initiation of the fuel supply stop control,
   so that the exhaust gas air-fuel ratio comes to be the theoretical air-fuel ratio.

6. A method of controlling an internal combustion engine to which an exhaust gas purification device is provided that purifies exhaust gas emitted from a combustion chamber, the gas purification device including a catalyst that has an active element and a carrier, the active element being served for activating an oxidizing reaction or a reducing reaction of a specific component contained in the exhaust gas, the carrier being served for carrying the active element,
   the active element forming a solid solution component in the carrier if a temperature of the catalyst is equal to or more than a predetermined first solid solution temperature and an internal atmosphere of the catalyst is an oxidizing atmosphere, while the active element being deposited from the carrier if the temperature of the catalyst is equal to or more than a predetermined deposition temperature and the internal atmosphere of the catalyst is a reducing atmosphere,
   the method comprising the steps of:
   controlling operation of the internal combustion engine by a control unit, the control unit operatively connected to the internal combustion engine;
   calculating, by the control unit, a deviation between a solid solubility that represents a degree the active element forms a solid solution component in the carrier and a target solid solubility when a fuel supply stop control is requested to perform; and
   operating the internal combustion engine, by the control unit, to suspend a performance of the fuel supply stop control if the deviation is equal to or more than a predetermined first threshold value and the temperature of the catalyst is equal to or more than a second solid solution temperature.

7. The control device of the internal combustion engine according to claim 3, wherein (i) when the fuel supply stop control is requested to perform, the deviation is equal to or more than the second threshold value and the temperature of the catalyst is equal to or more than the second solid solution temperature, and (ii) an amount incremental procedure has been performed for allowing the air-fuel ratio control to adjust an air-fuel ratio of a mixture supplied to the combustion engine to be a theoretical air-fuel ratio,
   the control unit is configured to perform,
   after completion of the amount incremental procedure, the fuel-air ratio control, during a fifth predetermined period prior to the initiation of the fuel supply stop control,
   so that the exhaust gas air-fuel ratio comes to be the theoretical air-fuel ratio.

8. The control device of the internal combustion engine according to claim 4, wherein
   (i) when the fuel supply stop control is requested to perform, the deviation is equal to or more than the second threshold value and the temperature of the catalyst is equal to or more than the second solid solution temperature, and (ii) an amount incremental procedure has been performed for allowing the air-fuel ratio control to adjust an air-fuel ratio of a mixture supplied to the combustion engine to be a theoretical air-fuel ratio,
   the control unit is configured to perform,
   after completion of the amount incremental procedure, the fuel-air ratio control, during a fifth predetermined period prior to the initiation of the fuel supply stop control,
   so that the exhaust gas air-fuel ratio comes to be the theoretical air-fuel ratio.

9. The control device of the internal combustion engine according to claim 1, wherein
   (i) when the fuel supply stop control is requested to perform, the deviation is equal to or more than the second threshold value and the temperature of the catalyst is equal to or more than the second solid temperature, and (ii) the air-fuel ratio control has been performed so that the air-fuel ratio of the mixture supplied to the combustion engine to be the theoretical air-fuel ratio during a predetermined period immediately before the fuel supply stop control is requested to perform,
   the control unit is configured to perform a fuel supply increase control, so as to decrease the air-fuel ratio of the mixture to a value less than the theoretical air-fuel ratio by increasing the fuel supplied to the combustion chamber, and to suspend the performance of the fuel supply stop control.

10. The control device of the internal combustion engine according to claim 7, wherein
    (i) when the fuel supply stop control is requested to perform, the deviation is equal to or more than the second threshold value and the temperature of the catalyst is equal to or more than the second solid temperature, and (ii) the air-fuel ratio control has been performed so that the air-fuel ratio of the mixture supplied to the combustion engine to be the theoretical air-fuel ratio during a predetermined period immediately before the fuel supply stop control is requested to perform,
    the control unit is configured to perform a fuel supply increase control, so as to decrease the air-fuel ratio of the mixture to a value less than the theoretical air-fuel ratio by increasing the fuel supplied to the combustion chamber, and to suspend the performance of the fuel supply stop control.

11. The control device of the internal combustion engine according to claim 8, wherein
(i) when the fuel supply stop control is requested to perform, the deviation is equal to or more than the second threshold value and the temperature of the catalyst is equal to or more than the second solid temperature, and (ii) the air-fuel ratio control has been performed so that the air-fuel ratio of the mixture supplied to the combustion engine to be the theoretical air-fuel ratio during a predetermined period immediately before the fuel supply stop control is requested to perform,
the control unit is configured to perform a fuel supply increase control, so as to decrease the air-fuel ratio of the mixture to a value less than the theoretical air-fuel ratio by increasing the fuel supplied to the combustion chamber, and to suspend the performance of the fuel supply stop control.

12. The control device of the internal combustion engine according to claim 1, wherein
the first solid solution temperature is different from the second solid solution temperature.

13. The method of controlling an internal combustion engine to claim 6, wherein
the first solid solution temperature is different from the second solid solution temperature.

* * * * *